US012216396B2

(12) United States Patent
Chen et al.

(10) Patent No.: US 12,216,396 B2
(45) Date of Patent: Feb. 4, 2025

(54) IMAGING LENS, CAMERA MODULE AND ELECTRONIC DEVICE

(71) Applicant: LARGAN PRECISION CO., LTD., Taichung (TW)

(72) Inventors: Hao Jan Chen, Taichung (TW); Yu Chen Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 239 days.

(21) Appl. No.: 17/888,282

(22) Filed: Aug. 15, 2022

(65) Prior Publication Data

US 2023/0341746 A1    Oct. 26, 2023

(30) Foreign Application Priority Data

Apr. 22, 2022    (TW) .................................. 111115330

(51) Int. Cl.
| | | |
|---|---|---|
| *G03B 9/06* | (2021.01) | |
| *G02B 9/64* | (2006.01) | |
| *G02B 13/00* | (2006.01) | |

(52) U.S. Cl.
CPC ................. *G03B 9/06* (2013.01); *G02B 9/64* (2013.01); *G02B 13/001* (2013.01)

(58) Field of Classification Search
None
See application file for complete search history.

(56) References Cited

U.S. PATENT DOCUMENTS

| | | | | |
|---|---|---|---|---|
| 10,812,692 B2* | 10/2020 | Kim | ........................ | G02B 5/005 |
| 10,824,051 B2* | 11/2020 | Seo | ........................ | G03B 13/36 |
| 10,969,653 B2 | 4/2021 | Kim | | |
| 11,169,430 B2* | 11/2021 | Seo | ....................... | G03B 17/565 |
| 2008/0213555 A1 | 9/2008 | Ono et al. | | |

(Continued)

FOREIGN PATENT DOCUMENTS

| | | |
|---|---|---|
| CN | 108933886 A | 12/2018 |
| CN | 110579926 A | 12/2019 |

(Continued)

OTHER PUBLICATIONS

European Search Report issued in corresponding application No. 22192638.9, dated Sep. 5, 2023.

(Continued)

*Primary Examiner* — Rodney E Fuller
(74) *Attorney, Agent, or Firm* — Maschoff Brennan

(57) ABSTRACT

An imaging lens with an optical axis includes a lens carrier and a variable through hole assembly. The lens carrier is configured for at least one lens element to be disposed therein, and the lens carrier includes a mount structure. The variable through hole assembly includes a plurality of movable blades and a rotatable element. The movable blades movably and together surround the optical axis to form a through hole, and a size of the through hole is variable by movement of the movable blades. The rotatable element is connected to the movable blades, and the rotatable element moves the movable blades to vary the size of the through hole. At least one of the movable blades and the rotatable element of the variable through hole assembly is disposed on the mount structure.

25 Claims, 37 Drawing Sheets

(56) References Cited

U.S. PATENT DOCUMENTS

| | | |
|---|---|---|
| 2012/0076486 A1 | 3/2012 | Bai et al. |
| 2013/0343737 A1 | 12/2013 | Ryu et al. |
| 2019/0373145 A1 | 12/2019 | Yu et al. |
| 2019/0377238 A1 | 12/2019 | Kim et al. |
| 2020/0064711 A1 | 2/2020 | Kim et al. |
| 2020/0348493 A1 | 11/2020 | Seo et al. |
| 2020/0401014 A1* | 12/2020 | Seo .......................... G03B 9/06 |
| 2021/0109305 A1 | 4/2021 | Hu et al. |

FOREIGN PATENT DOCUMENTS

| | | |
|---|---|---|
| CN | 110858048 A | 3/2020 |
| CN | 112099225 A | 12/2020 |
| CN | 112147772 A | 12/2020 |
| CN | 112262566 A | 1/2021 |
| CN | 113259545 A | 8/2021 |
| JP | H0590459 U | 12/1993 |
| JP | 2009-195084 | 8/2009 |
| JP | 2011-191490 A | 9/2011 |
| JP | 2013-190705 A | 9/2013 |

OTHER PUBLICATIONS

Taiwan Office Action issued in corresponding application No. 111115330, dated Aug. 24, 2023.

* cited by examiner

IMAGING LENS, CAMERA MODULE AND ELECTRONIC DEVICE

RELATED APPLICATIONS

This application claims priority to Taiwan Application 111115330, filed on Apr. 22, 2022, which is incorporated by reference herein in its entirety.

BACKGROUND

Technical Field

The present disclosure relates to an imaging lens, a camera module and an electronic device, more particularly to an imaging lens and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture stop can be used to change the depth of field for adjusting the blur degree of the background and controlling the amount of incident light, such that arranging a variable aperture stop in an optical system of an electronic device becomes a forward-looking subject. However, the accuracy of the position of the variable aperture stop will significantly affect image quality of the optical system. Conventional variable aperture stops are easily offset during assembling or working, which may cause glare, light leak, or poor resolution and therefore negatively affect image quality. Therefore, how to improve the accuracy of the variable aperture stop and the integration degree between components thereof for meeting the requirement of high-end-specification electronic devices is an important topic in this field nowadays.

SUMMARY

According to one aspect of the present disclosure, an imaging lens with an optical axis includes a lens carrier and a variable through hole assembly. The lens carrier is configured for at least one lens element to be disposed therein, and the lens carrier includes a mount structure. The variable through hole assembly includes a plurality of movable blades and a rotatable element. The movable blades movably and together surround the optical axis to form a through hole, and a size of the through hole is variable by movement of the movable blades. The rotatable element is connected to the movable blades, and the rotatable element moves the movable blades to vary the size of the through hole. At least one of the movable blades and the rotatable element of the variable through hole assembly is disposed on the mount structure.

According to another aspect of the present disclosure, a camera module includes the abovementioned imaging lens.

According to another aspect of the present disclosure, an electronic device includes the abovementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
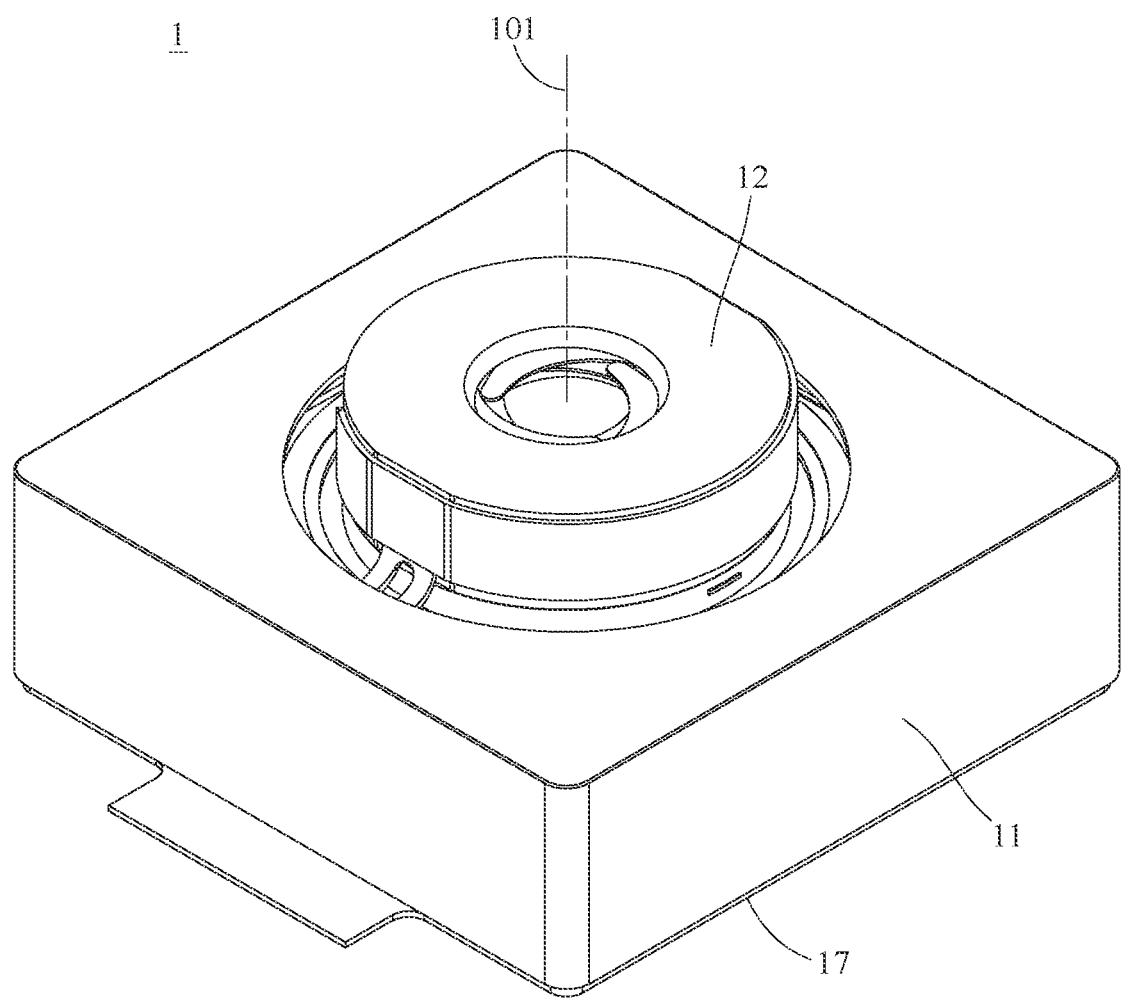
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module that can include a fixed part, a movable part and an image sensor. The movable part may be movable with respect to the fixed part. The movable part can include an imaging lens and at least one lens element. The image sensor can be disposed on an image surface of the imaging lens.

The imaging lens has an optical axis. The imaging lens includes a lens carrier and a variable through hole assembly. The lens carrier is able for the at least one lens element to be disposed therein, and the lens carrier can include a mount structure and a ferromagnetic element. The variable through hole assembly can include a plurality of movable blades, a rotatable element, at least one electromagnetic pair and a through hole circuit.

The movable blades movably and together surround the optical axis to form a through hole. A size of the through hole is variable by movement of the movable blades. Moreover, the through hole can be disposed at a position where an aperture of the imaging lens is located. Therefore, it is favorable for taking the through hole with a variable size as a physical aperture stop of the imaging lens. Moreover, when an f-number of the imaging lens is FNO, the following condition can be satisfied: FNO≥1.1. Therefore, it is favorable for increasing the feasibility of taking the through hole as the aperture stop. Moreover, the following condition can also be satisfied: FNO≥1.3. Moreover, the following condition can also be satisfied: FNO≥1.7. Moreover, the at least one lens element can include a positive lens element that is disposed adjacent to the through hole. The term "positive lens element" in the present disclosure refers to a lens element with positive refractive power, which can converge light in a paraxial region. With the arrangement of the positive lens element, imaging light can be converged so as to increase the amount of light incident into the through hole.

The rotatable element is connected to the movable blades. The rotatable element is movable for driving the movable blades to vary the size of the through hole, thereby enabling a variable through hole.

At least one of the movable blades and the rotatable element of the variable through hole assembly is disposed on the mount structure. With the abovementioned arrangement, it is favorable for reducing offset of the variable through hole assembly in a direction in parallel with the optical axis, thereby ensuring a light-blocking effect of the movable blades and further ensuring image quality of the imaging lens. Further, by assembling lens elements in the lens carrier, it is favorable for simplifying assembly processes, thereby increasing manufacturing efficiency. Moreover, the mount structure can include a plurality of post structures that can be disposed respectively corresponding to the movable blades, and the relative displacement between the post structures and the rotatable element can drive the movable blades to rotate. Therefore, it is favorable for precisely controlling the variety of the through hole. Moreover, the relative displacement between the post structures and the rotatable element can also drive the movable blades to move.

When the movable blades are disposed on the mount structure, the mount structure can have a gap surface according to the imaging lens disclosed in one embodiment of the present disclosure. The gap surface and the rotatable element can form a gap therebetween, and the movable blades can be disposed in the gap. Moreover, when a thickness of the gap is TG, and a thickness of each movable blade is TB, the following condition can be satisfied: 0.002 [um]≤TG−TB 0.3 [um]. With providing the movable blades in an appropriate gap, it is favorable for ensuring optical quality and reducing resistance during the movement of the movable blades. Moreover, the following condition can also be satisfied: 0.003 [um]≤TG−TB 0.1 [um]. Please refer to FIG. 29, which shows TG and TB according to the 3rd embodiment of the present disclosure.

When the movable blades are disposed on the mount structure, the mount structure can further include a fixed element according to the imaging lens disclosed in one embodiment of the present disclosure. The fixed element and the lens carrier can be relatively fixed. The fixed element can have a gap surface. The gap surface and one of the mount structure and the rotatable element can form a gap therebetween, and the movable blades can be disposed in the gap. Moreover, when a thickness of the gap is TG', a thickness of each movable blade is TB, the following condition can be satisfied: 0.002 [um]≤TG'−TB≤0.3 [um]. With providing the movable blades in an appropriate gap, it is favorable for ensuring optical quality and reducing resistance during the movement of the movable blades. Moreover, the following condition can also be satisfied: 0.003 [um]≤TG'−TB≤0.1 [um]. Please refer to FIG. 6, which shows TG' and TB according to the 1st embodiment of the present disclosure.

When the movable blades are disposed on the mount structure, the mount structure can have an abut surface according to the imaging lens disclosed in one embodiment of the present disclosure. The movable blades can be disposed on the abut surface. Moreover, a value of arithmetical mean roughness (Ra) of the abut surface can be smaller than 0.25 micrometers. Therefore, it is favorable for reducing friction of the movable blades on the abut surface, thereby increasing life span of the movable blades. Moreover, the value of arithmetical mean roughness (Ra) of the abut surface can also be smaller than 0.20 micrometers. Moreover, the value of arithmetical mean roughness (Ra) of the abut surface can also be smaller than 0.17 micrometers.

When the rotatable element is disposed on the mount structure, the variable through hole assembly can further include a plurality of rollable elements according to the imaging lens disclosed in one embodiment of the present disclosure. The rollable elements can be disposed between the mount structure and the rotatable element and can be arranged surrounding the through hole to provide freedom of movement of the rotatable element in a rotation direction. Therefore, it is favorable for smoothing the movement of the movable blades driven by the rotatable element. Moreover, the mount structure can have a plurality of grooves corresponding to the rollable elements. Therefore, it is favorable for restrict motion paths of the rollable elements. Moreover, the grooves can be arc grooves. Moreover, the rollable elements can be spherical. Moreover, the rollable elements can also be cylindrical. Moreover, the rollable elements can also be conical.

When the rotatable element is disposed on the mount structure, the mount structure can have a slide surface according to the imaging lens disclosed in one embodiment of the present disclosure. The rotatable element can be slidably located on the slide surface. Moreover, a coefficient of kinetic friction of the rotatable element on the slide surface can be smaller than 0.52. Therefore, it is favorable for smoothing the movement of the movable blades driven by the rotatable element. Moreover, the coefficient of kinetic friction of the rotatable element on the slide surface can also be equal to or smaller than 0.3. Moreover, the coefficient of kinetic friction of the rotatable element on the slide surface can also be equal to or smaller than 0.11. Please be noted that the slide surface can be achieved by coating a low friction coating thereon, disposing a lubricating material thereon or designing a surface appearance having low friction characteristics.

Figure 40:
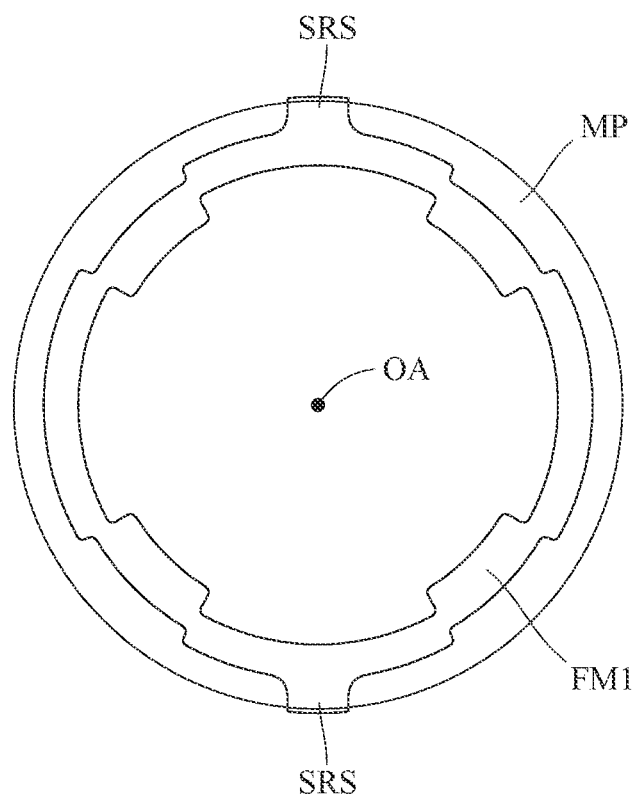
FIG. 40 is a schematic view showing a configuration of a ferromagnetic element in a main part of a lens carrier according to the present disclosure.
Figure 41:
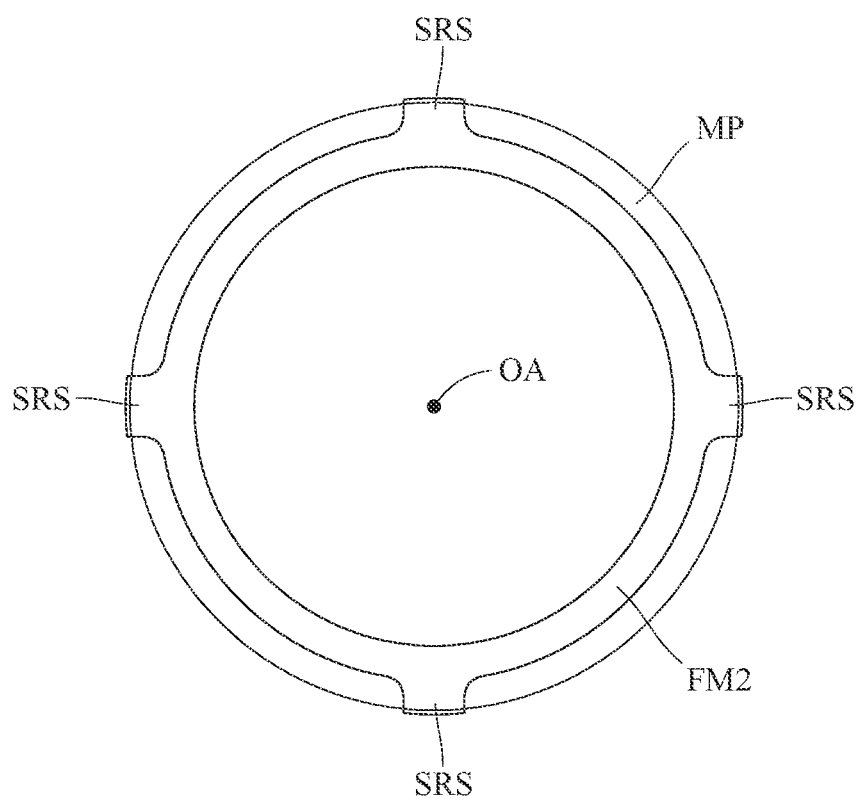
FIG. 41 is a schematic view showing another configuration of a ferromagnetic element in a main part of a lens carrier according to the present disclosure.
Figure 42:
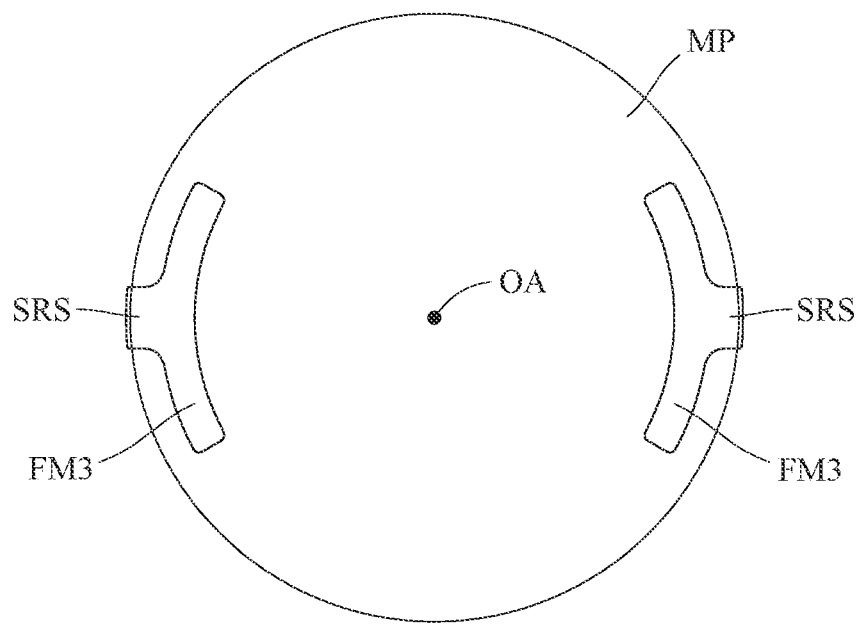
FIG. 42 is a schematic view showing further another configuration of a ferromagnetic element in a main part of a lens carrier according to the present disclosure.
Figure 43:
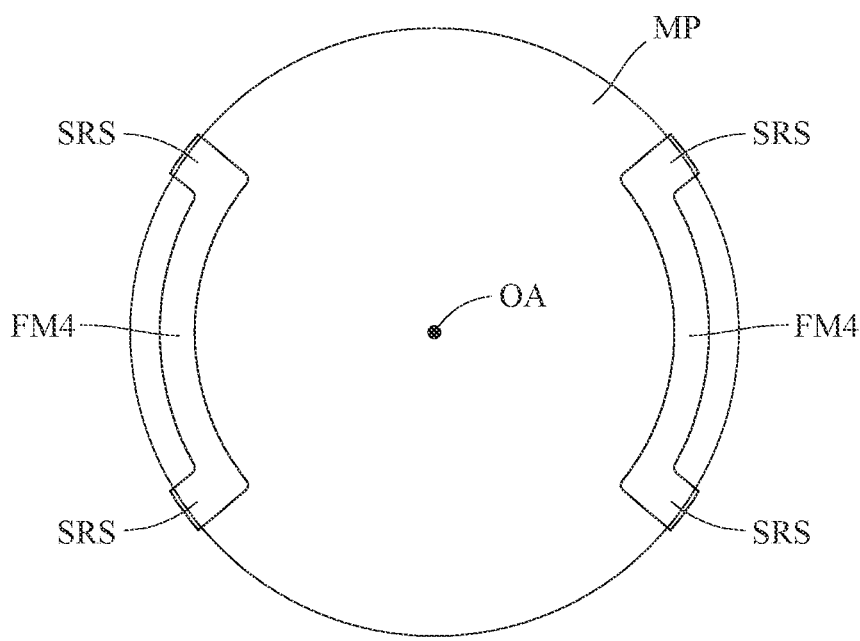
FIG. 43 is a schematic view showing still another configuration of a ferromagnetic element in a main part of a lens carrier according to the present disclosure.

The at least one electromagnetic pair can include a through hole magnet and a through hole coil. The through hole magnet can be disposed on the rotatable element. The through hole coil can be disposed opposite to the through hole magnet. The through hole coil can be electrically connected to the through hole circuit so as to provide electricity for driving the rotatable element to rotate. Therefore, it is favorable for precisely controlling the variety of the through hole. Moreover, the quantity of the at least one electromagnetic pair can be two, and the two electromagnetic pairs can be symmetrically disposed. Therefore, it is favorable for the electromagnetic pairs to evenly apply a force, thereby preventing offset of the rotatable element. Moreover, the through hole magnet can be disposed corresponding to the ferromagnetic element. Therefore, it is favorable for preventing offset of the variable through hole assembly with respect to the lens carrier during or after the assembly processing. Moreover, the ferromagnetic element can be disposed surrounding the optical axis. Moreover, the ferromagnetic element can also be disposed partially surrounding the optical axis. Moreover, the ferromagnetic element is fixed in the lens carrier through, for example, an insert molding process. Please refer to FIG. 40, which shows a ferromagnetic element FM1 disposed surrounding the optical axis OA and fixed in the main part MP of the lens carrier via two securing structures SRS thereof according to one embodiment of the present disclosure. Please refer to FIG. 41, which shows a ferromagnetic element FM2 disposed surrounding the optical axis OA and fixed in the main part MP of the lens carrier via four securing structures SRS thereof according to another embodiment of the present disclosure. Please refer to FIG. 42, which shows two ferromagnetic elements FM3 disposed partially surrounding the optical axis OA and fixed in the main part MP of the lens carrier via a securing structure SRS thereof according to further another embodiment of the present disclosure. Please refer to FIG. 43, which shows two ferromagnetic elements FM4 disposed partially surrounding the optical axis OA and fixed in the main part MP of the lens carrier via two securing structures SRS thereof according to still another embodiment of the present disclosure.

The through hole circuit can include a control circuit. The control circuit can control the through hole coil to generate a magnetic field for driving the rotatable element to rotate. Therefore, it is favorable for reducing the quantity of wires of the through hole circuit for outward connection. Moreover, the through hole circuit can further include a position sensing circuit. The position sensing circuit detects a position of the rotatable element. Therefore, it is favorable for the through hole circuit to have a functionality of feedback control. Moreover, a through hole controller integrating the abovementioned control circuit and the abovementioned position sensing circuit can be provided. Therefore, it is favorable for simplifying the component configuration.

Figure 44:
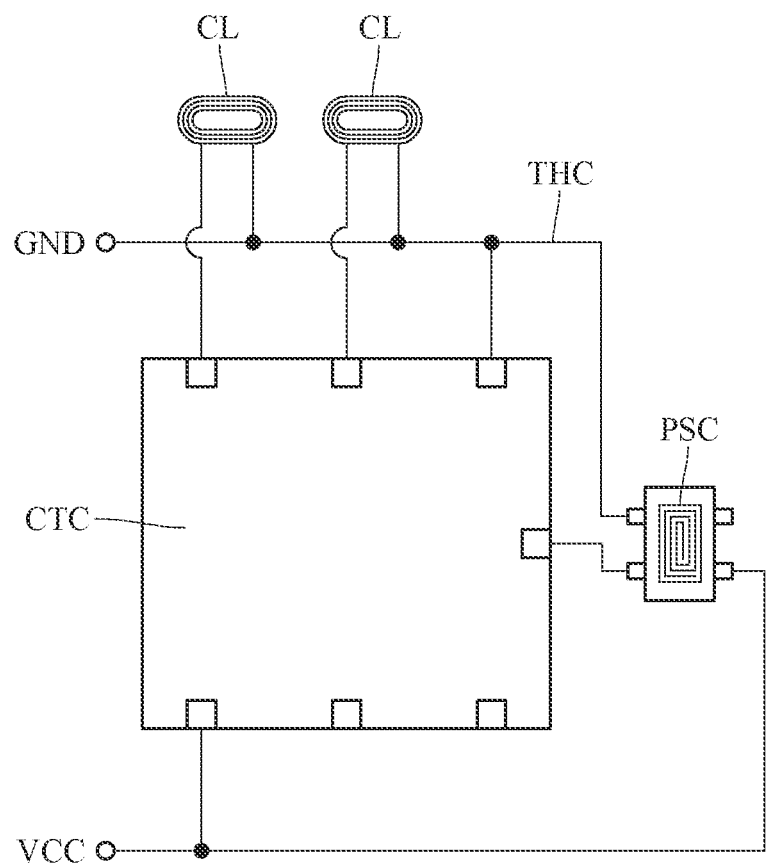
FIG. 44 is a schematic electrical diagram of a control circuit and a position sensing circuit with other components according to the present disclosure.
Figure 46:
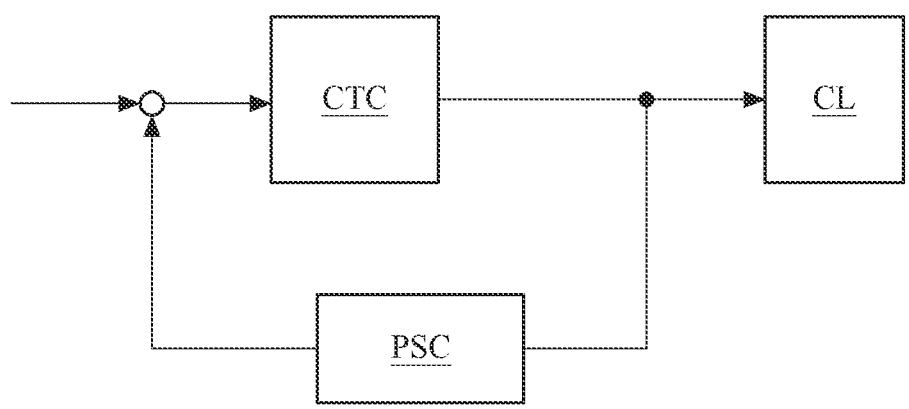
FIG. 46 is a block diagram of a control circuit and a position sensing circuit with other components according to the present disclosure.

In one embodiment of the present disclosure, the electrical connection and feedback control process of the control circuit and the position sensing circuit with collaborated coils are illustrated in reference to FIG. 44 and FIG. 46, where FIG. 44 is a schematic electrical diagram of a control circuit and a position sensing circuit with other components according to the present disclosure, and FIG. 46 is a block diagram of a control circuit and a position sensing circuit with other components according to the present disclosure. In FIG. 44, a control circuit CTC and a position sensing circuit PSC are two separate components and electrically connected to a power VCC and connected to the ground GND via a through hole circuit THC. The control circuit CTC is electrically connected to coils CL so as to control the coils CL to generate required magnetic fields. One end of each of the coils CL is electrically connected to the ground GND, and each coil CL may be the through hole coil or the driving coil in the specification. The position sensing circuit PSC is configured to obtain the position information of a rotatable element and a through hole magnet in a direction surrounding the through hole, and the position sensing circuit PSC is electrically connected to the control circuit CTC so as to generate a signal to the control circuit CTC according to the obtained position information. As shown in FIG. 46, in a closed loop feedback control system, the position sensing circuit PSC detects the position of the through hole magnet on the rotatable element and feedbacks the same to the control circuit CTC, and therefore the control circuit CTC can adjust the magnetic field generated by the coils CL so as to adjust the position of the rotatable element.

Figure 45:
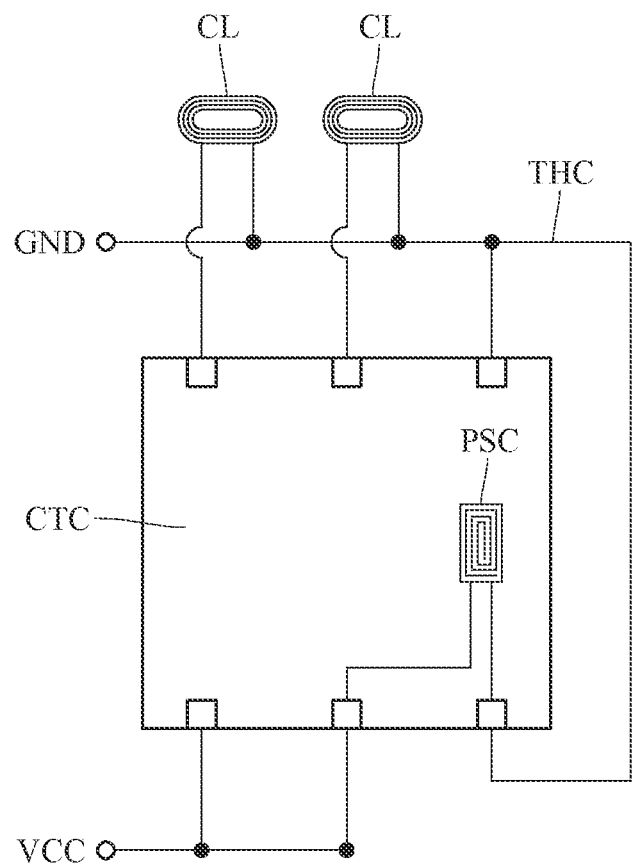
FIG. 45 is another schematic electrical diagram of a through hole controller integrating a control circuit and a position sensing circuit with other components according to the present disclosure.

In another embodiment of the present disclosure, the electrical connection and feedback control process of the through hole controller integrating the control circuit and the position sensing circuit with collaborated coils is illustrated in reference to FIG. 45 and FIG. 46, where FIG. 45 is another schematic electrical diagram of a through hole controller integrating a control circuit and a position sensing circuit with other components according to the present disclosure, and FIG. 46 is a block diagram of a control circuit and a position sensing circuit with other components according to the present disclosure. In FIG. 45, a control circuit CTC and a position sensing circuit PSC are integrated into a through hole controller and electrically connected to a power VCC and connected to the ground GND via a through hole circuit THC. The control circuit CTC is electrically connected to coils CL so as to control the coils CL to generate required magnetic fields. One end of each of the coils CL is electrically connected to the ground GND, and each coil CL may be the through hole coil or the driving coil in the specification. The position sensing circuit PSC is configured to obtain the position information of a rotatable element and a through hole magnet in a direction surrounding the through hole. As shown in FIG. 46, in a closed loop feedback control system, the position sensing circuit PSC detects the position of the through hole magnet on the rotatable element and feedbacks the same to the control circuit CTC, and therefore the control circuit CTC can adjust the magnetic field generated by the coils CL so as to adjust the position of the rotatable element.

The camera module disclosed in the present disclosure can further include an elastic element. The elastic element can be connected to the fixed part and the movable part to provide freedom of movement of the movable part in at least one direction with respect to the fixed part.

According to the camera module disclosed in one embodiment of the present disclosure, the elastic element can have electrical conductivity, and the elastic element can be electrically connected to the through hole circuit. Therefore, it is favorable for simplifying the circuit configuration of the camera module.

According to the camera module disclosed in one embodiment of the present disclosure, the camera module can further include an electrical connection element. The electrical connection element can include a plurality of conductive routes that can be electrically connected to the through hole circuit and the fixed part. Moreover, an elastic modulus of the electrical connection element can be smaller than an elastic modulus of the elastic element in a direction in parallel with the optical axis. Therefore, it is favorable for preventing the mechanical force balance of the movable part from being interfered by the electrical connection element. Moreover, the elastic modulus of the electrical connection element can also be smaller than half of the elastic modulus of the elastic element in the direction in parallel with the optical axis. Moreover, the elastic modulus of the electrical connection element can also be smaller than one fifth ($\frac{1}{5}$) of the elastic modulus of the elastic element in the direction in parallel with the optical axis.

According to the camera module disclosed in one embodiment of the present disclosure, the fixed part can include a conductive terminal. The movable part can further include a groove structure and a conductive colloid. The groove structure can be located on the lens carrier. Therefore, it is favorable for reducing the quantity of total components. The conductive colloid can be disposed in the groove structure. The conductive terminal can extend to the conductive colloid, and the conductive terminal can be electrically connected to the through hole circuit via the conductive colloid. Therefore, it is favorable for reducing the influence of the circuit structure on the operation of the imaging lens, and it is also favorable for simplifying the complexity of wire configuration, thereby increasing the yield rate. Moreover, the conductive colloid can be made of a damping material. Therefore, it is favorable for achieving a buffering effect by collaborating the damping material of the conductive colloid with the structure of the conductive terminal.

The camera module disclosed in the present disclosure can further include a driving part. The driving part can include a driving magnet and a driving coil that can be disposed opposite to each other. Moreover, the lens carrier can further include a driving mount structure. One of the driving magnet and the driving coil can be disposed on the driving mount structure. Therefore, it is favorable for sufficiently utilizing the internal space of the camera module. When the driving coil is mounted on the driving mount structure, the driving coil can be electrically connected to the through hole circuit. Therefore, it is favorable for simplifying the complexity of wire configuration, thereby increasing the yield rate.

A distance between the optical axis of the imaging lens and a position of the image sensor located furthest away from the optical axis of the imaging lens can be defined as a maximum image height. When the maximum image height is ImgH, the following condition can be satisfied: ImgH≥2 [mm]. Therefore, it is favorable for collaborating the large-sized image sensor with the variable-sized through hole, thereby generating diverse shooting effects. Moreover, the following condition can also be satisfied: ImgH≥3 [mm]. Moreover, the following condition can also be satisfied: ImgH≥4 [mm]. Moreover, the following condition can also be satisfied: ImgH≥6 [mm]. Moreover, the following condition can also be satisfied: ImgH≥8 [mm].

The imaging lens can have a maximum field of view corresponding to the maximum image height. When the maximum field of view is FOV, the following condition can be satisfied: FOV≤100 [deg.]. Therefore, with the appropriate maximum field of view, it is favorable for making the size of the through hole to be controllable. Moreover, the following condition can also be satisfied: FOV≤95 [deg.]. Moreover, the following condition can also be satisfied: FOV≤90 [deg.].

The present disclosure provides an electronic device that include the abovementioned camera module.

According to the present disclosure, the aforementioned features and conditions can be utilized in numerous combinations so as to achieve corresponding effects.

According to the above description of the present disclosure, the following specific embodiments are provided for further explanation. Please be noted that the enlarged and aligned section views in the drawings are formed by many non-parallel sections without considering the difference in the axial direction therebetween, which can better present the structural relationship in the radial direction. Therefore, some structures in the enlarged and aligned section views are not shown as the actual situation.

1st Embodiment

Figure 2:
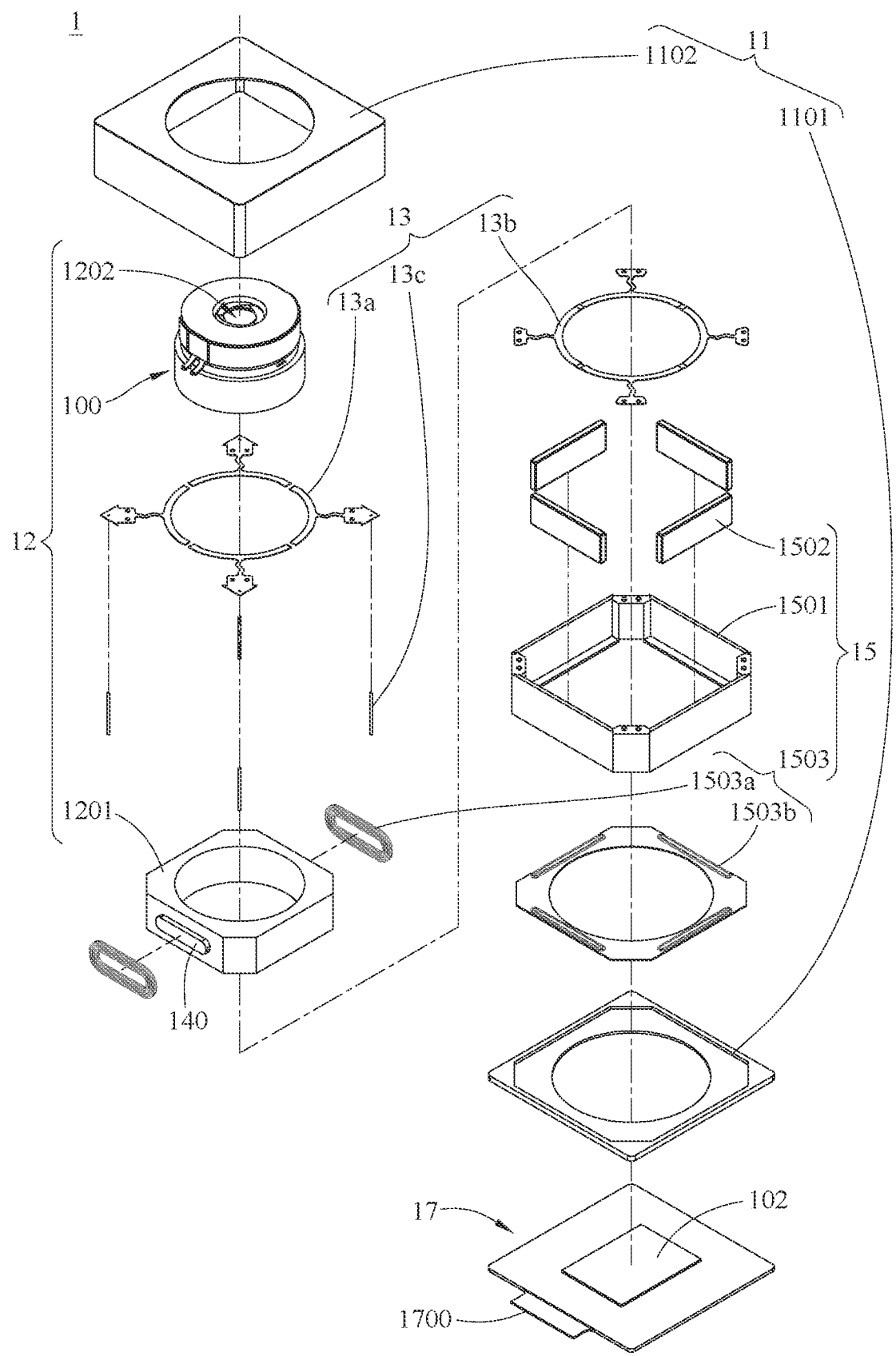
FIG. 2 is an exploded view of the camera module in FIG. 1.
Figure 3:
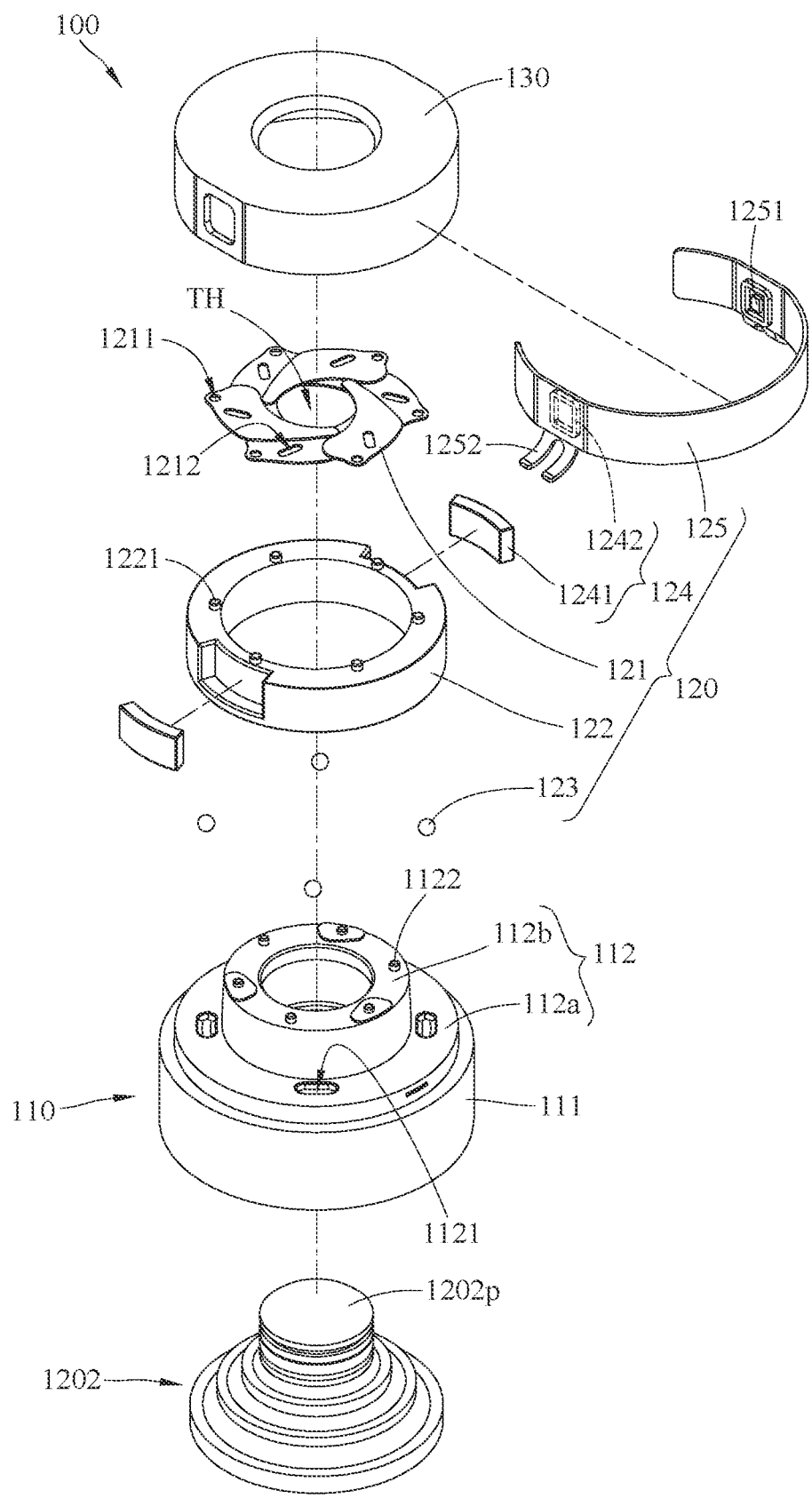
FIG. 3 is an exploded view of an imaging lens of the camera module in FIG. 2.
Figure 4:
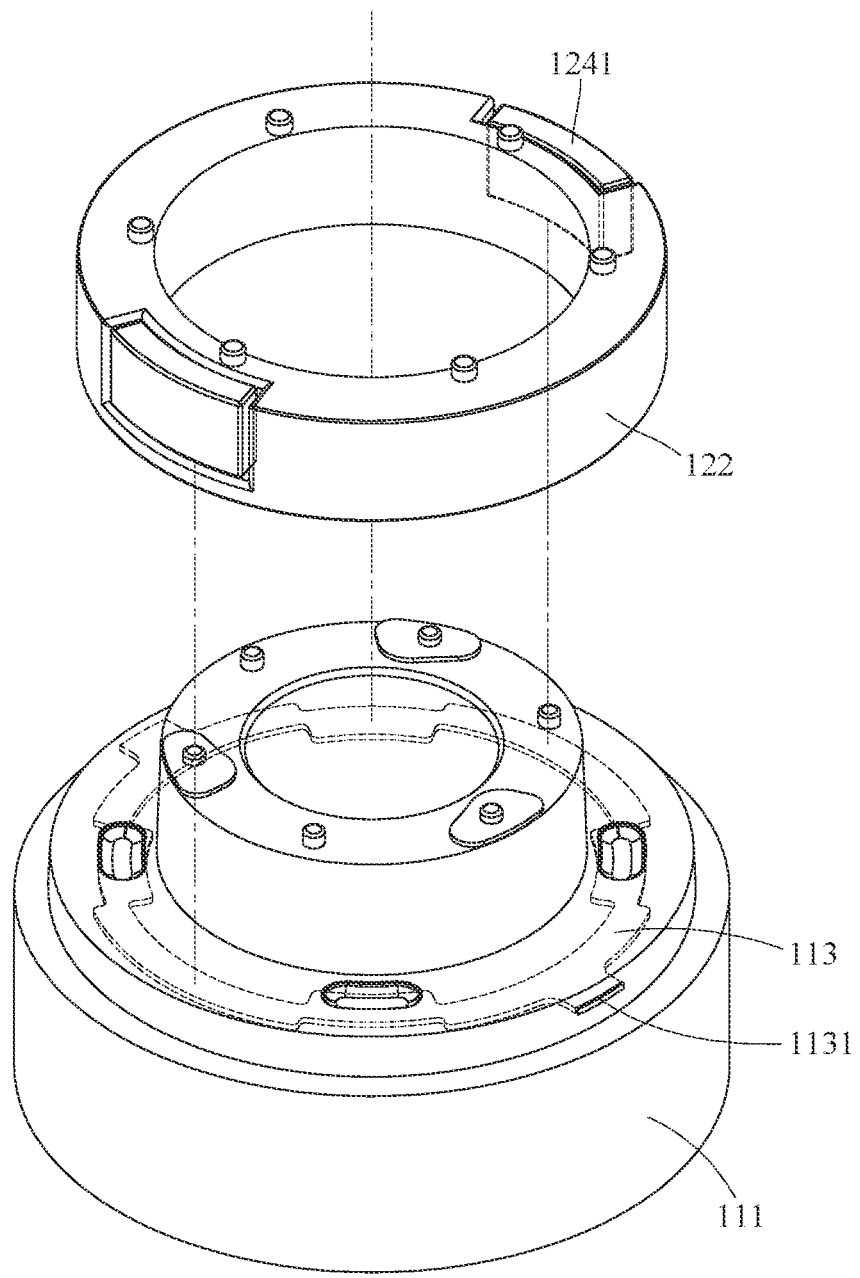
FIG. 4 is a schematic view showing the corresponding relationship among part of components of the imaging lens in FIG. 3.
Figure 5:
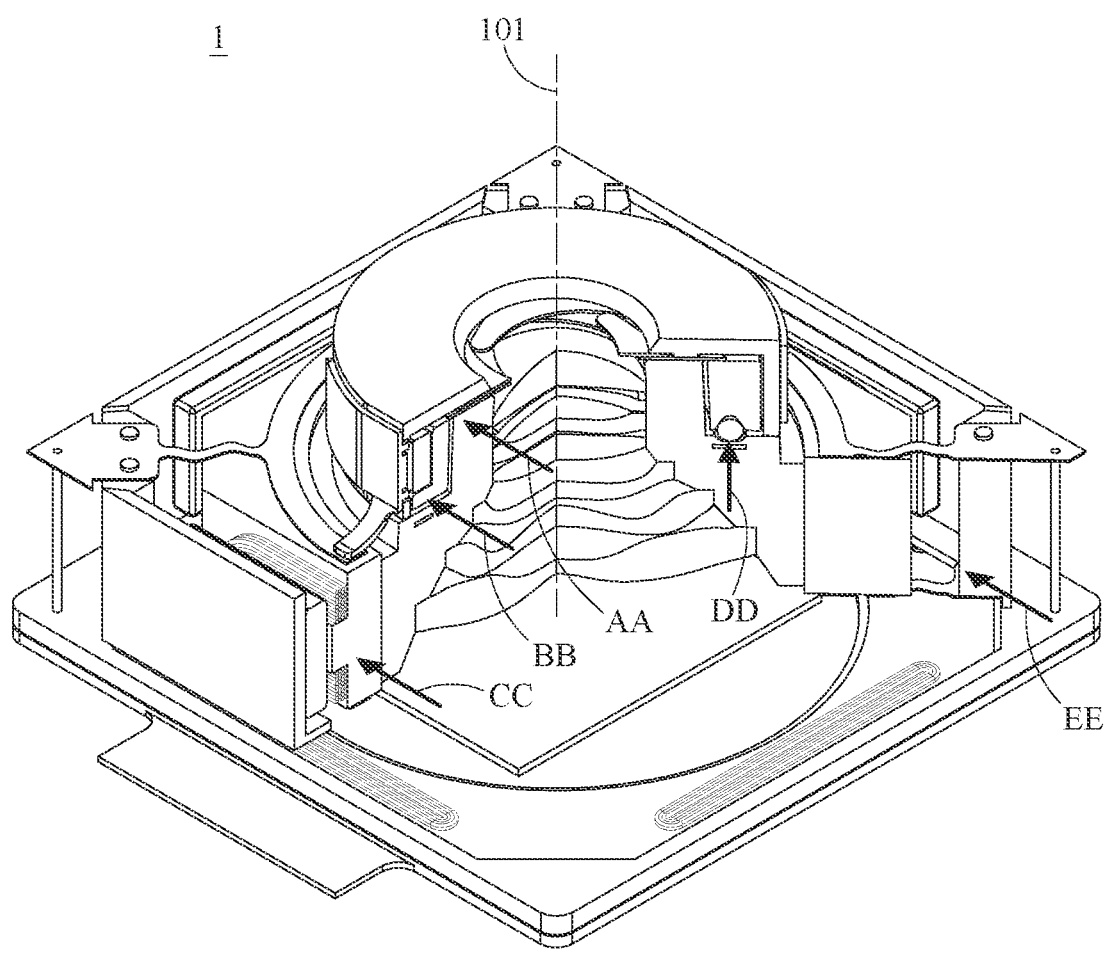
FIG. 5 is a perspective view of the camera module in FIG. 1 that has been partially sectioned.
Figure 6:
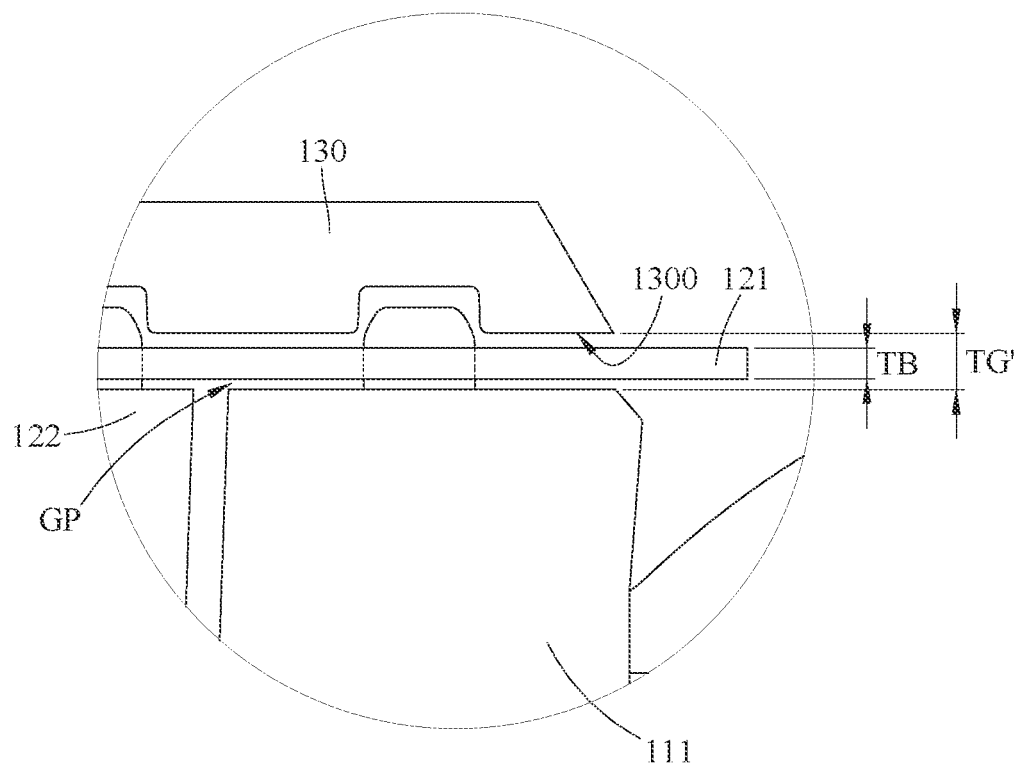
FIG. 6 is an enlarged and aligned section view of AA region of the partially sectioned camera module in FIG. 5.
Figure 7:
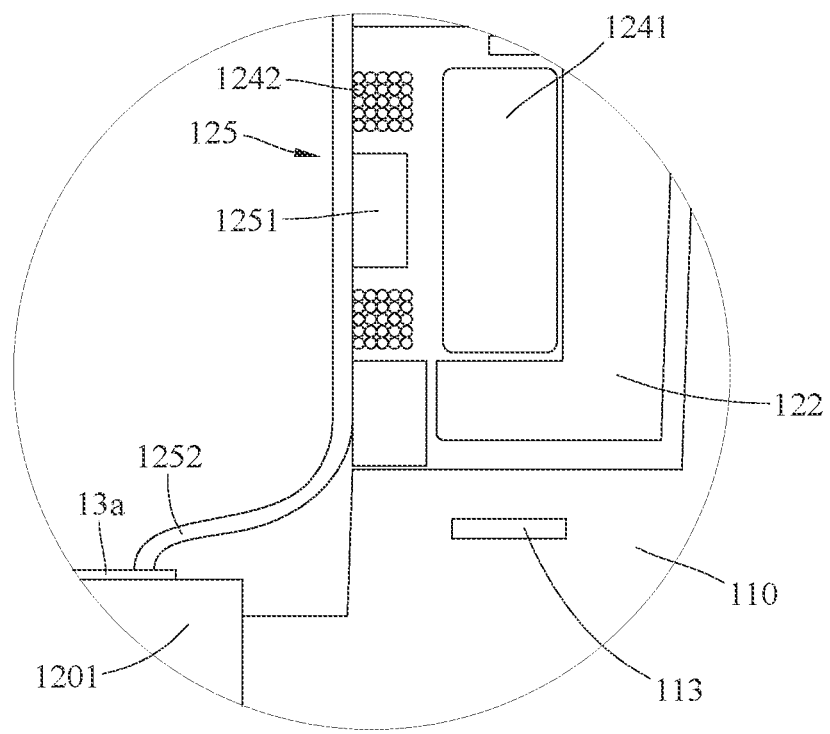
FIG. 7 is an enlarged and aligned section view of BB region of the partially sectioned camera module in FIG. 5.
Figure 8:
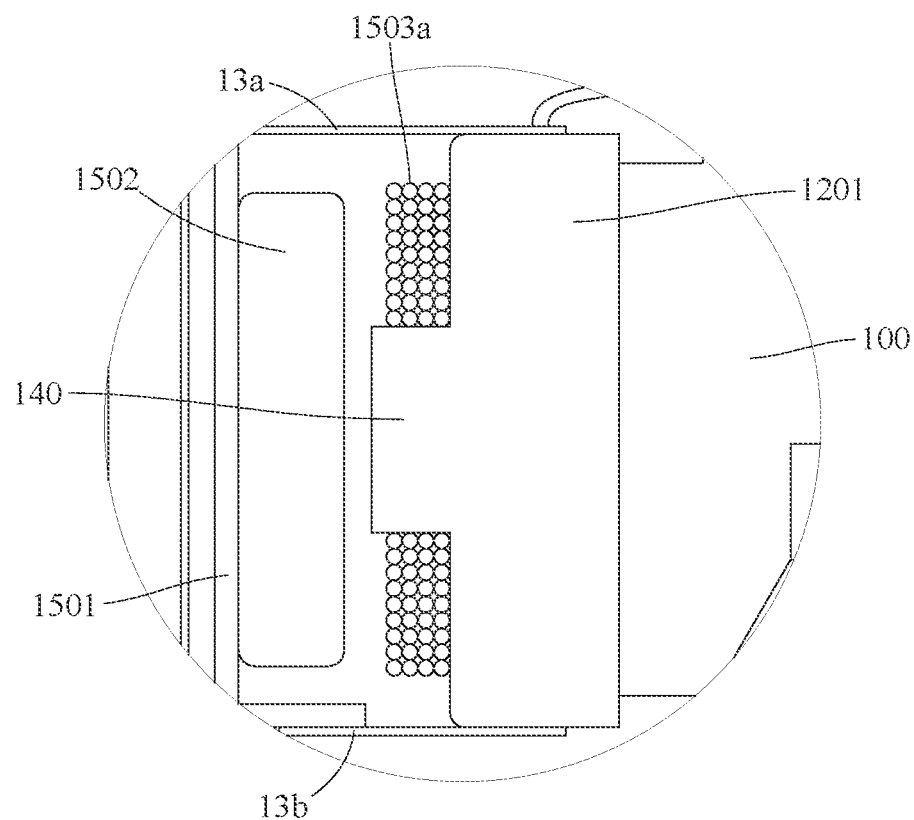
FIG. 8 is an enlarged and aligned section view of CC region of the partially sectioned camera module in FIG. 5.
Figure 9:
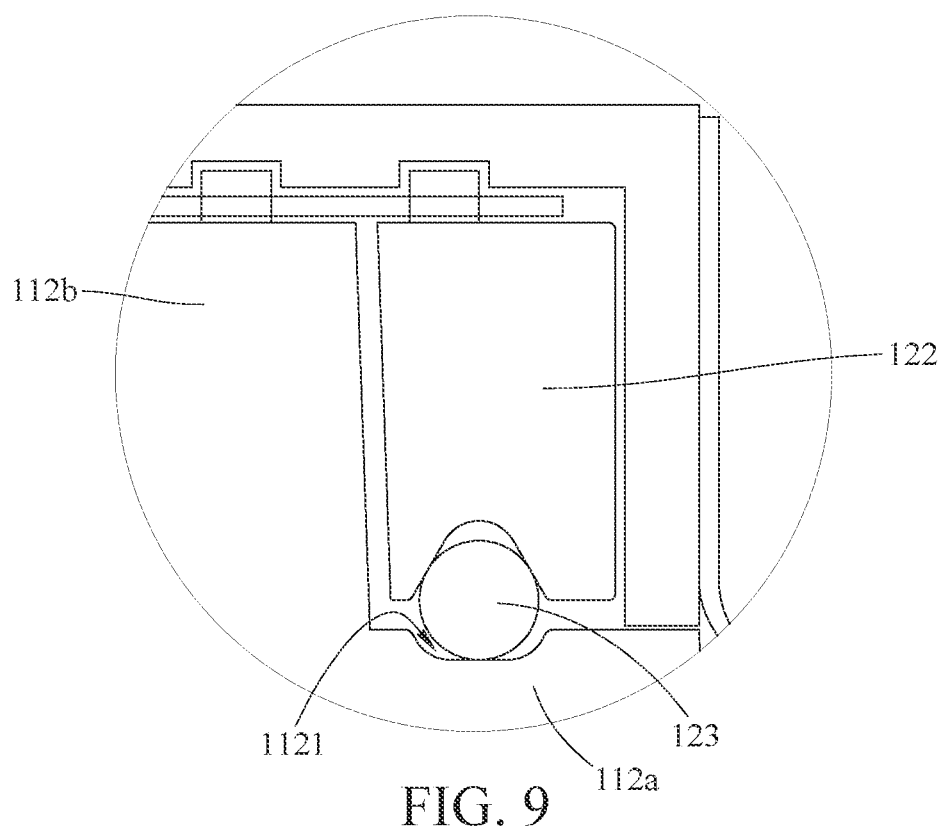
FIG. 9 is an enlarged and aligned section view of DD region of the partially sectioned camera module in FIG. 5.
Figure 10:
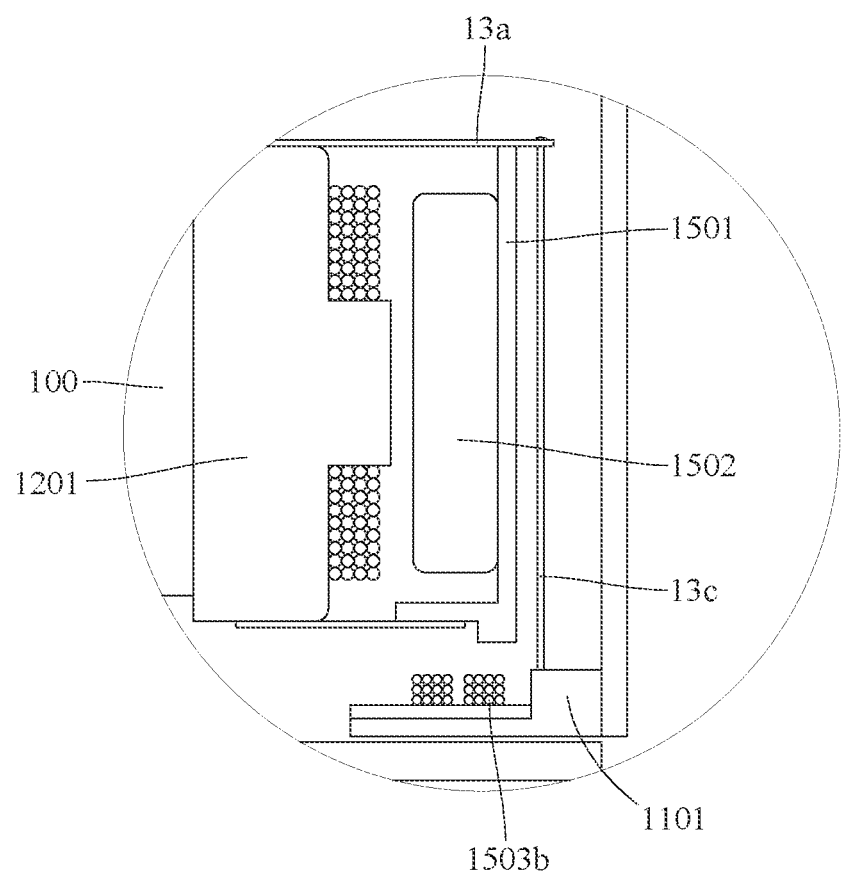
FIG. 10 is an enlarged and aligned section view of EE region of the partially sectioned camera module in FIG. 5.

Please refer to FIG. 1 to FIG. 10, where FIG. 1 is a perspective view of a camera module according to the 1st embodiment of the present disclosure, FIG. 2 is an exploded view of the camera module in FIG. 1, FIG. 3 is an exploded view of an imaging lens of the camera module in FIG. 2, FIG. 4 is a schematic view showing the corresponding relationship among part of components of the imaging lens in FIG. 3, FIG. 5 is a perspective view of the camera module in FIG. 1 that has been partially sectioned, FIG. 6 is an enlarged and aligned section view of AA region of the partially sectioned camera module in FIG. 5, FIG. 7 is an enlarged and aligned section view of BB region of the partially sectioned camera module in FIG. 5, FIG. 8 is an enlarged and aligned section view of CC region of the partially sectioned camera module in FIG. 5, FIG. 9 is an enlarged and aligned section view of DD region of the partially sectioned camera module in FIG. 5, and FIG. 10 is an enlarged and aligned section view of EE region of the partially sectioned camera module in FIG. 5.

A camera module 1 provided in this embodiment includes a fixed part 11, a movable part 12, an elastic element 13, a driving part 15 and an image sensor 17.

The fixed part 11 includes a base 1101 and a casing 1102. The casing 1102 is disposed on the base 1101, and the base 1101 and the casing 1102 together form an accommodation space (not numbered) for accommodating the movable part 12, the elastic element 13 and the driving part 15.

The movable part 12 is movable with respect to the fixed part 11. In detail, the movable part 12 includes an imaging lens carrier 1201, an imaging lens 100 and a plurality of lens elements 1202. The imaging lens 100 is accommodated in the imaging lens carrier 1201. The imaging lens 100 has an optical axis 101 and an image surface 102. The optical axis 101 passes through the image surface 102. The lens elements 1202 are accommodated in the imaging lens 100. The elastic element 13 includes four first elastic elements 13a having electrical conductivity, a second elastic element 13b and four third elastic elements 13c. The driving part 15 includes a driving magnet carrier 1501, four driving magnets 1502 and two driving coils 1503. The driving magnets 1502 are disposed on the driving magnet carrier 1501. As shown in FIG. 10, the first elastic elements 13a and the third elastic elements 13c are connected to and located between the driving magnet carrier 1501 of the driving part 15 and the base 1101, such that the imaging lens carrier 1201 together with the imaging lens 100 has freedom of movement in a direction perpendicular to the optical axis 101. As shown in FIG. 8, the first elastic elements 13a and the second elastic element 13b are connected to and located between the imaging lens carrier 1201 of the movable part 12 and the driving magnet carrier 1501 of the driving part 15, such that the imaging lens carrier 1201 together with the imaging lens 100 has freedom of movement in a direction in parallel with the optical axis 101.

The imaging lens 100 includes a lens carrier 110, a variable through hole assembly 120, a fixed element 130 and two driving mount structures 140.

The lens carrier 110 includes a main part 111, a mount structure 112 and a ferromagnetic element 113. The main part 111 is provided for the lens elements 1202 to be disposed therein. The mount structure 112 includes a first mount structure 112a and a second mount structure 112b. The first mount structure 112a has a plurality of grooves 1121. The second mount structure 112b includes a plurality of post structures 1122. As shown in FIG. 4, the ferromagnetic element 113 has securing structures 1131. The ferromagnetic element 113 is fixed in the main part 111 through the securing structures 1131.

The variable through hole assembly 120 includes a plurality of movable blades 121, a rotatable element 122, four spherical rollable elements 123, two pairs of electromagnetic pairs 124 and a through hole circuit 125.

The movable blades 121 have a plurality of rotatable element corresponding holes 1211 and a plurality of lens carrier corresponding holes 1212. The movable blades 121 are movably and together surround the optical axis 101 to form a through hole TH, and a size of the through hole TH is variable by movement of the movable blades 121. The through hole TH is disposed at a position where an aperture of the imaging lens 100 is located, such that the through hole TH with a variable size is used as the physical aperture stop of the imaging lens 100. When the size of the through hole TH varies to the maximum, and an f-number of the imaging lens 100 is FNO, the following condition is satisfied: FNO=1.4. Moreover, the lens element 1202 includes a positive lens element 1202p that has positive refractive power and is disposed adjacent to the through hole TH.

The rotatable element 122 includes a plurality of post structures 1221. As shown in FIG. 3 and FIG. 9, the rollable elements 123 are disposed in the grooves 1121 and arranged surrounding the through hole TH. The rollable elements 123 disposed between the first mount structure 112a and the rotatable element 122 are able to provide freedom of movement of the rotatable element 122 with respect to the lens carrier 110 in a rotation direction taking the optical axis 101 as the rotation axis. The lens carrier corresponding holes 1212 of the movable blades 121 are disposed respectively corresponding to the post structures 1122 of the second mount structure 112b. The rotatable element corresponding holes 1211 of the movable blades 121 are disposed respectively corresponding to the post structures 1221 of the rotatable element 122. The relative displacement between the post structures 1122 of the second mount structure 112b and the post structures 1221 of the rotatable element 122 is able to drive the movable blades 121 to rotate and/or to move, thereby driving the movable blades 121 to vary the size of the through hole TH.

The two pairs of electromagnetic pairs 124 are disposed symmetric to each other. Each electromagnetic pair 124 includes a through hole magnet 1241 and a through hole coil 1242. As shown in FIG. 3, FIG. 4, and FIG. 7, the through hole magnets 1241 are disposed in recesses (not numbered) of the rotatable element 122 and corresponding to the ferromagnetic element 113 that surrounds the optical axis 101. As shown in FIG. 3 and FIG. 7, in each electromagnetic pair 124, the through hole coil 1242 is disposed opposite to the through hole magnet 1241.

The through hole circuit 125 is electrically connected to the through hole coils 1242 so as to provide electricity for driving the rotatable element 122 to rotate. The through hole circuit 125 includes a through hole controller 1251 and a plurality of circuit contacts 1252. The through hole controller 1251 integrates a control circuit and a position sensing circuit (not numbered). The through hole controller 1251 is disposed at the center of one of the through hole coils 1242. The control circuit of the through hole controller 1251 controls the through hole coils 1242 so as to generate magnetic field for driving the rotatable element 122 to rotate. As shown in FIG. 3 and FIG. 7, the position sensing circuit of the through hole controller 1251 is disposed opposite to one of the through hole magnets 1241 so as to sense changes in the magnetic field of the through hole magnets 1241, thereby obtaining position information of the rotatable element 122. As shown in FIG. 7, the through hole circuit 125 is electrically connected to the first elastic elements 13a via the circuit contacts 1252 so as to provide electricity and signals for the variable through hole assembly 120.

The fixed element 130 and the lens carrier 110 are relatively fixed. As shown in FIG. 6, the fixed element 130 has a gap surface 1300. The gap surface 1300 and the main part 111 of the lens carrier 110 form a gap GP therebetween, and the movable blades 121 are disposed in the gap GP. When a thickness of the gap GP is TG', and a thickness of each of the movable blades 121 is TB, the following conditions are satisfied: TG'=0.18 [um]; TB=0.1 [um]; and TG'−TB=0.08 [um]. In this embodiment, the arrangement manner of the movable blades 121 shown in FIG. 3, which are disposed through the rotatable element corresponding holes 1211 and the lens carrier corresponding holes 1212, is not intended to restrict the present disclosure. In some other embodiment of the present disclosure, the second mount structure can also have an abut surface where the movable blades are disposed thereon, and a value of arithmetical mean roughness (Ra) of the abut surface is smaller than 0.25 micrometers.

The driving mount structures 140 are disposed at two opposite sides of the imaging lens carrier 1201. The driving coils 1503 include two auto-focusing driving coils 1503a and four optical image stabilization driving coils 1503b.

As shown in FIG. 8, the auto-focusing driving coils 1503a are disposed on the driving mount structure 140 and opposite to the driving magnets 1502, and the auto-focusing driving coils 1503a are electrically connected to the through hole circuit 125 so that the imaging lens carrier 1201 together with the imaging lens 100 moves in a direction in parallel with the optical axis 101 for achieving a focusing function.

As shown in FIG. 10, the optical image stabilization driving coils 1503b are disposed on the base 1101 and opposite to the driving magnets 1502, such that the driving magnet carrier 1501 together with the imaging lens carrier 1201 and the imaging lens 100 translates in a direction perpendicular to the optical axis 101 for achieving an anti-shake function.

In some other embodiment of the present disclosure, the auto-focusing driving coils can be further electrically connected to the first elastic element and/or the third elastic element.

In some other embodiment of the present disclosure, the first elastic element can be further electrically connected to the third elastic element so as to conduct the through hole circuit.

The image sensor 17 is disposed on the image surface 102 and at a side of the base 1101 located away from the casing 1102. The image sensor 17 has an access contact 1700 for connecting external power.

A distance between the optical axis 101 of the imaging lens 100 and a position of the image sensor 17 located furthest away from the optical axis 101 of the imaging lens 100 is defined as a maximum image height. When the maximum image height is ImgH, the following condition is satisfied: ImgH=5.16 [mm].

The imaging lens 100 has a maximum field of view corresponding to the maximum image height ImgH. When the maximum field of view is FOV, the following condition is satisfied: FOV=83.0 [deg.].

2nd Embodiment

Figure 11:
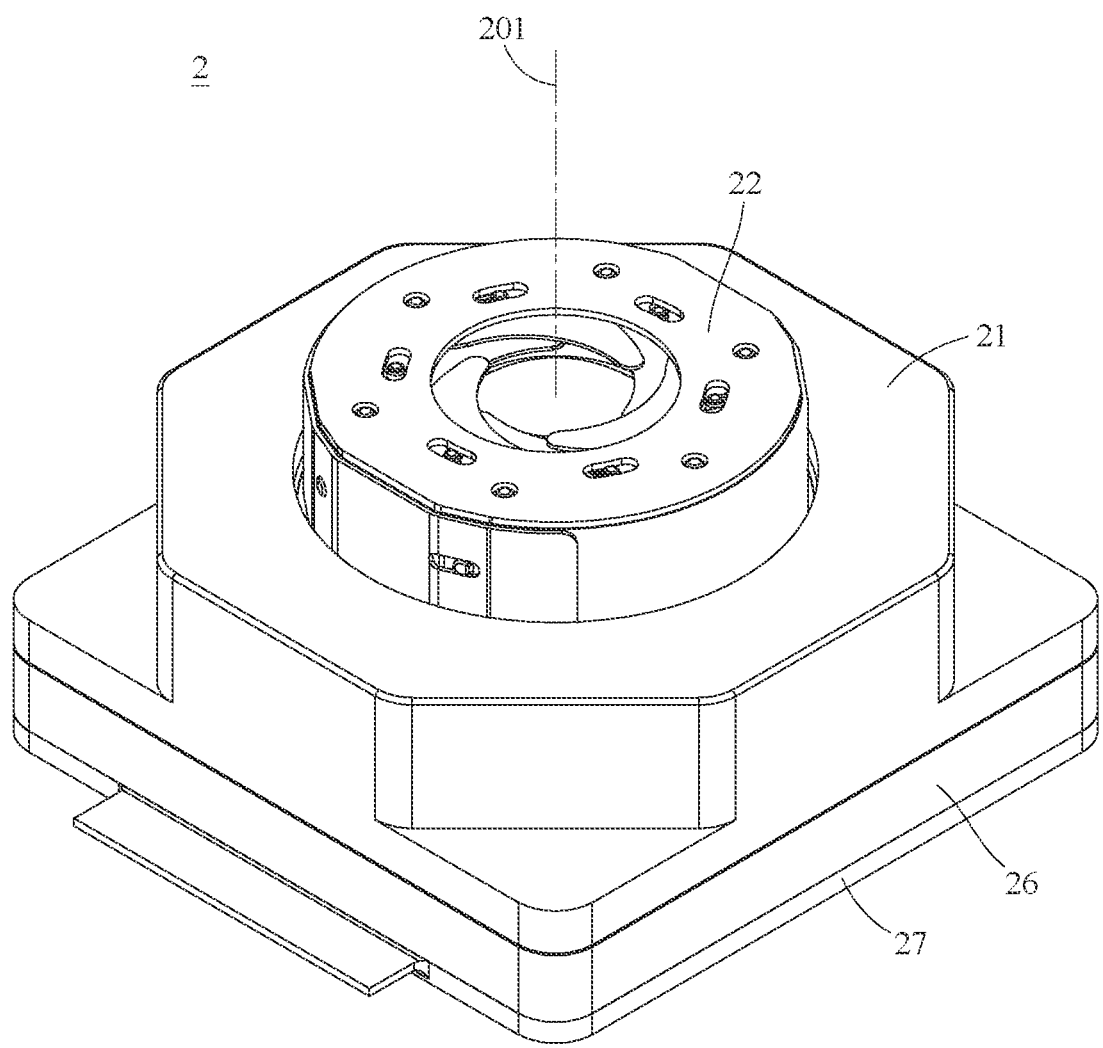
FIG. 11 is a perspective view of a camera module according to the 2nd embodiment of the present disclosure.
Figure 12:
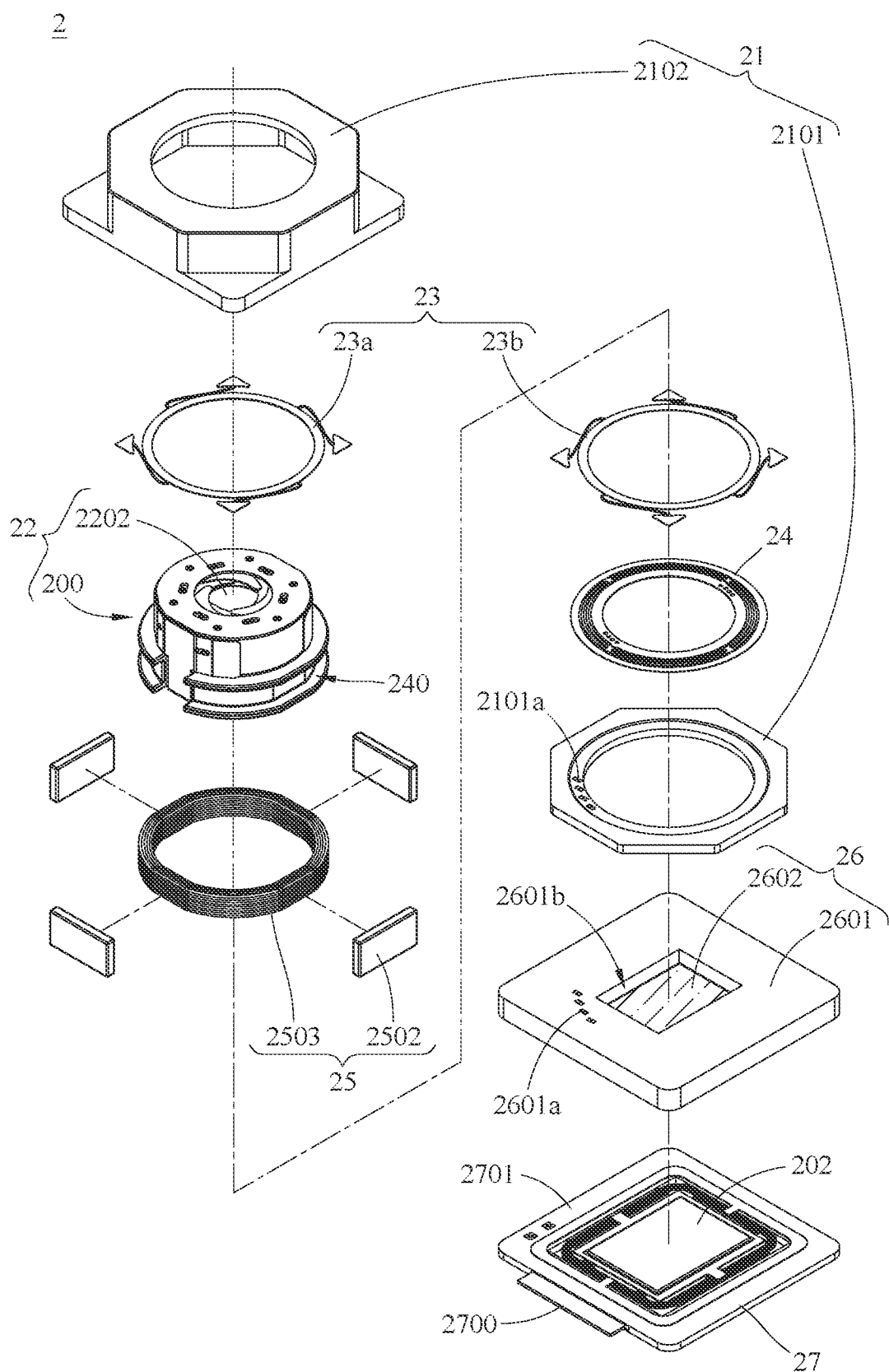
FIG. 12 is an exploded view of the camera module in FIG. 11.
Figure 13:
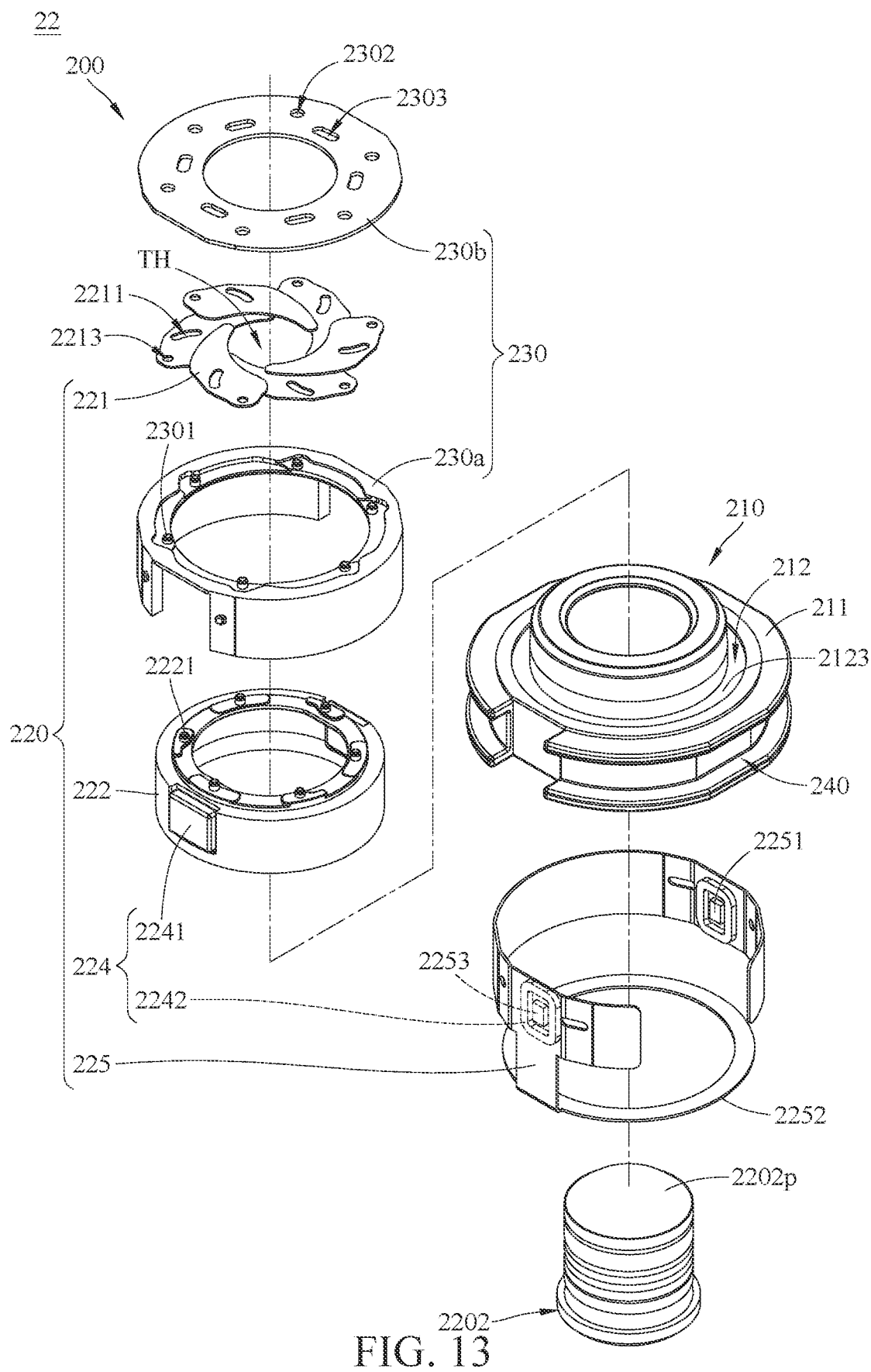
FIG. 13 is an exploded view of an imaging lens of the camera module in FIG. 12.
Figure 14:
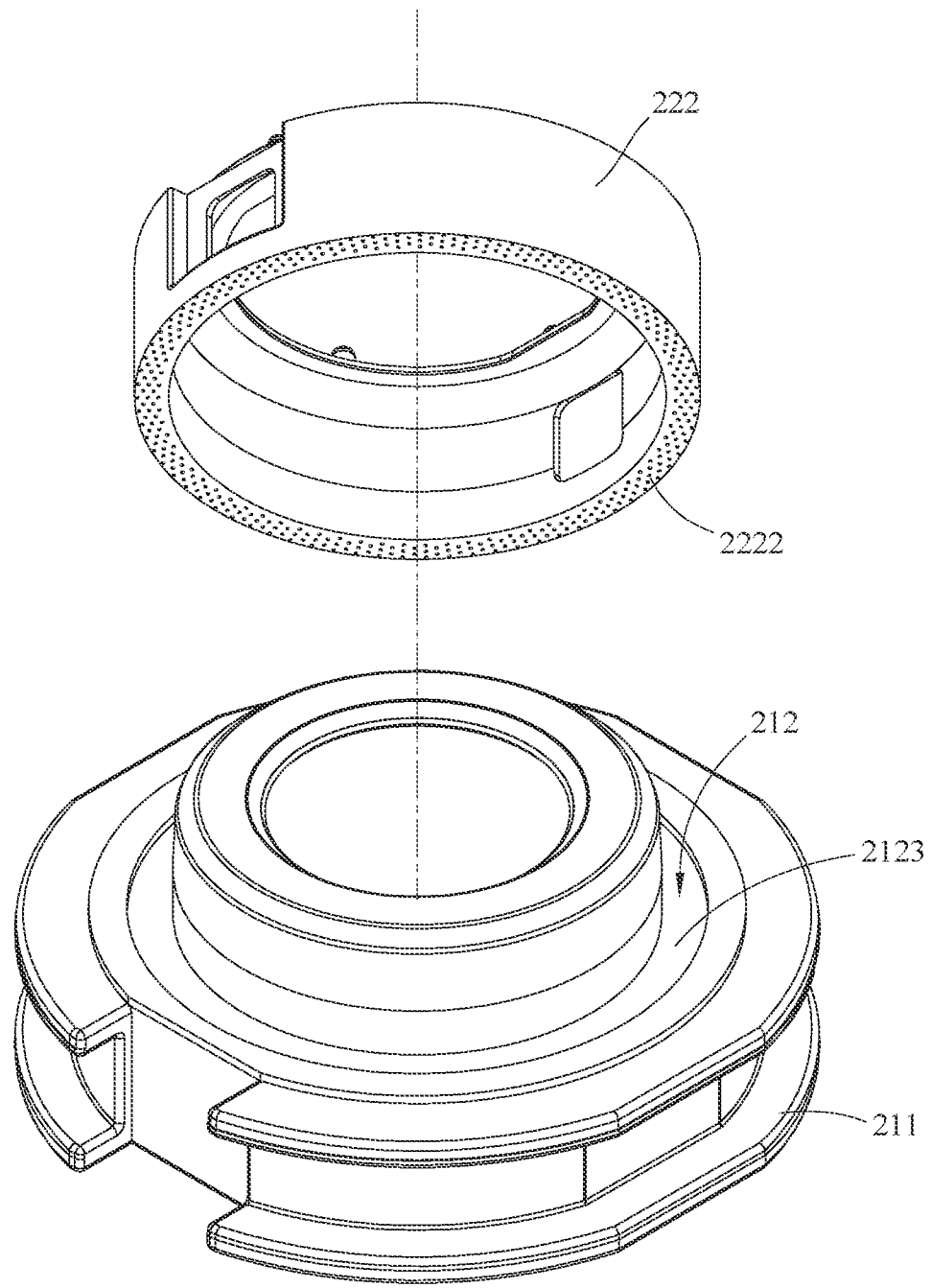
FIG. 14 is a schematic view showing the corresponding relationship among part of components of the imaging lens in FIG. 13.
Figure 15:
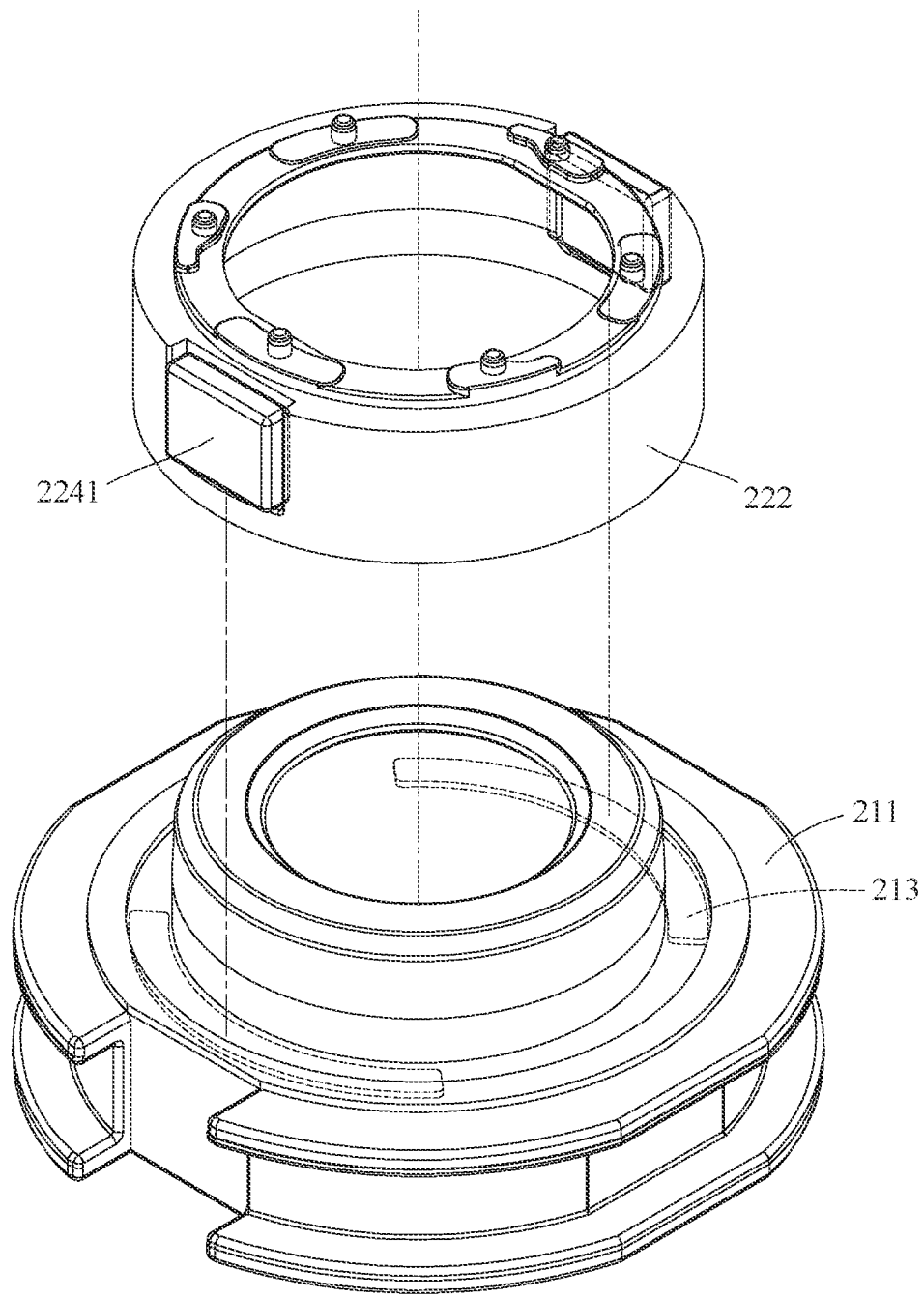
FIG. 15 is another schematic view showing the corresponding relationship among part of components of the imaging lens in FIG. 13.
Figure 16:
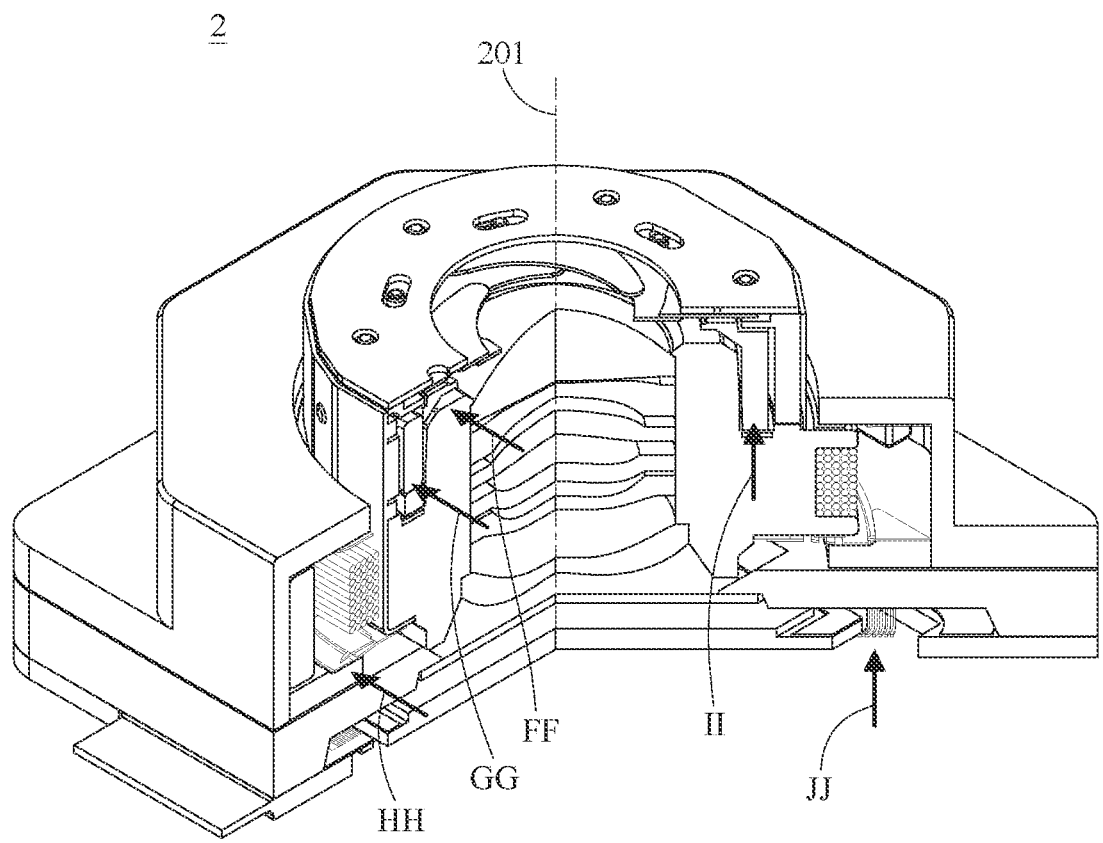
FIG. 16 is a perspective view of the camera module in FIG. 11 that has been partially sectioned.
Figure 17:
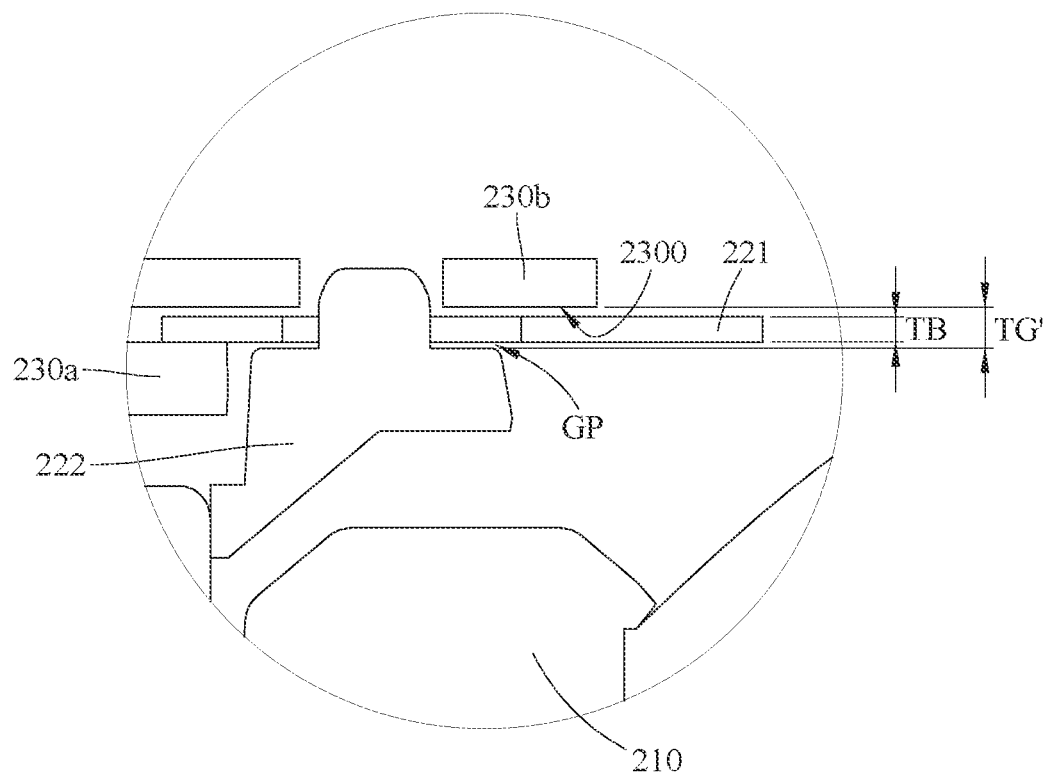
FIG. 17 is an enlarged and aligned section view of EE region of the partially sectioned camera module in FIG. 16.
Figure 18:
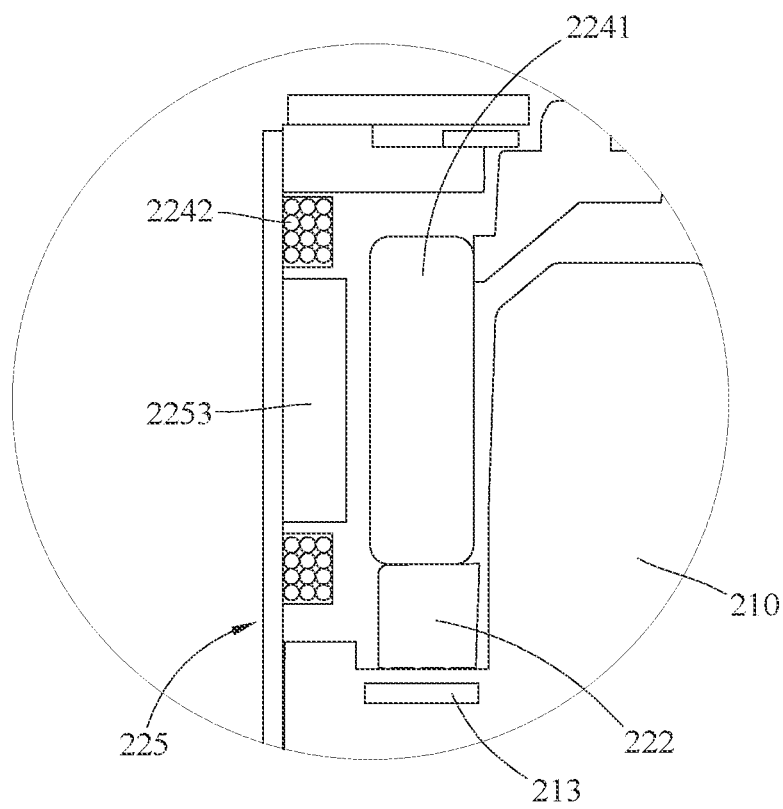
FIG. 18 is an enlarged and aligned section view of GG region of the partially sectioned camera module in FIG. 16.
Figure 19:
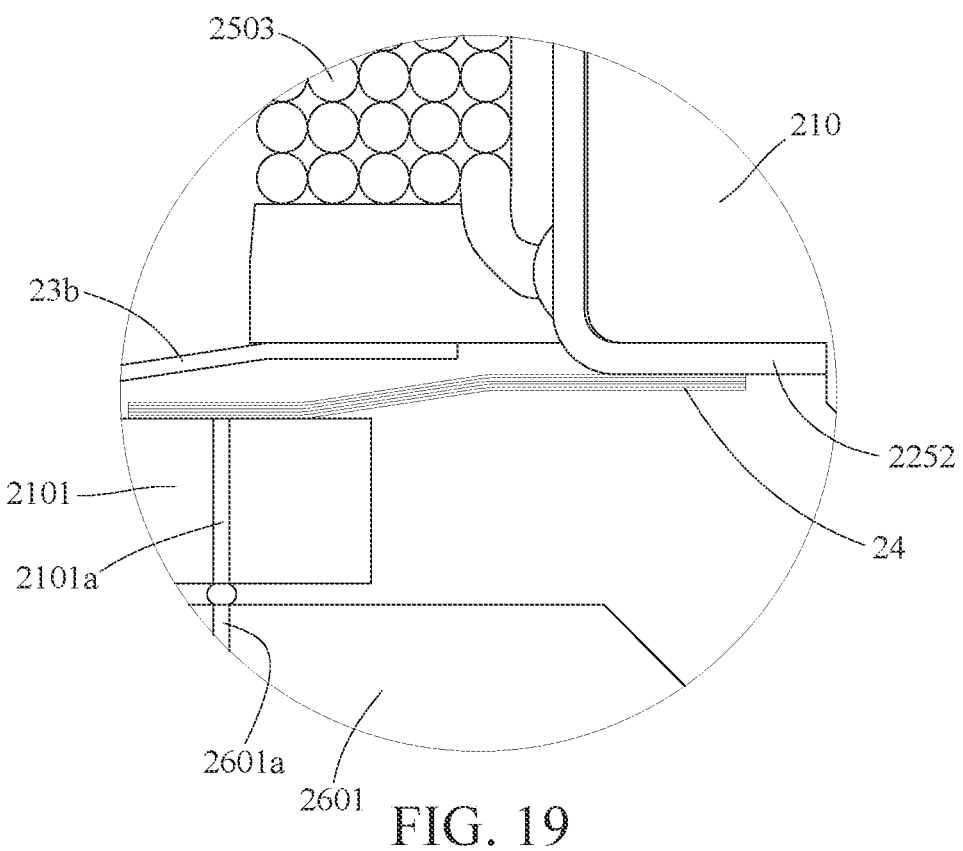
FIG. 19 is an enlarged and aligned section view of HH region of the partially sectioned camera module in FIG. 16.
Figure 20:
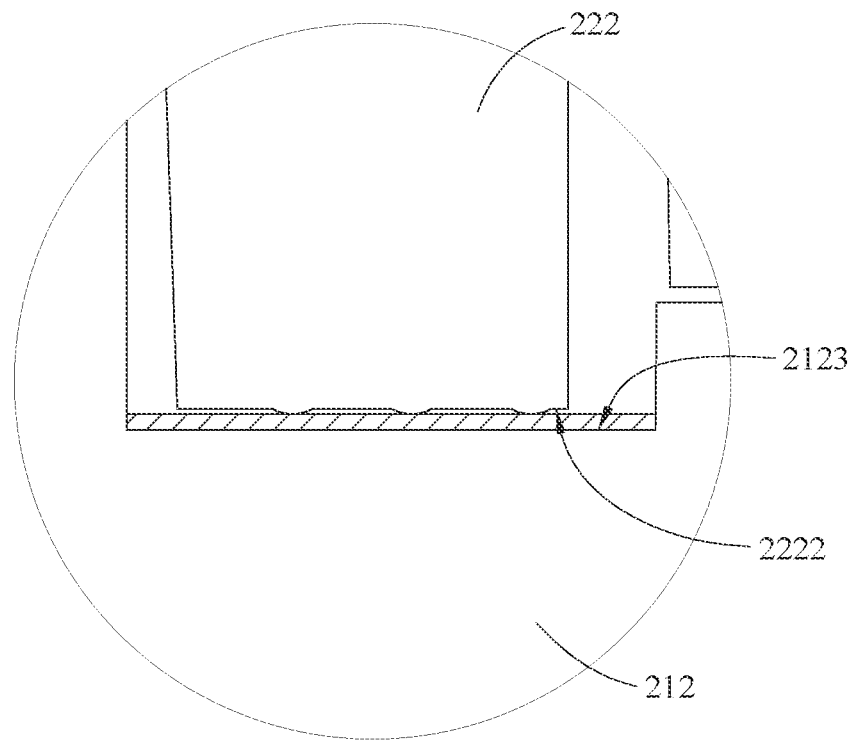
FIG. 20 is an enlarged and aligned section view of II region of the partially sectioned camera module in FIG. 16.
Figure 21:
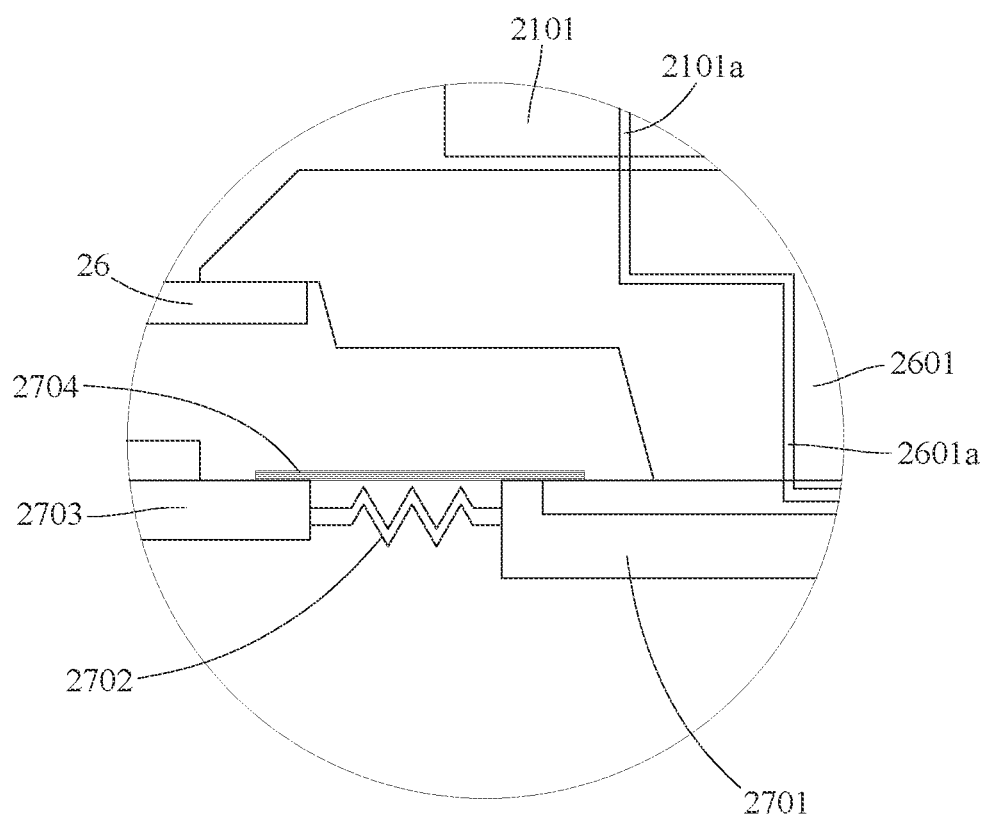
FIG. 21 is an enlarged and aligned section view of JJ region of the partially sectioned camera module in FIG. 16.
Figure 22:
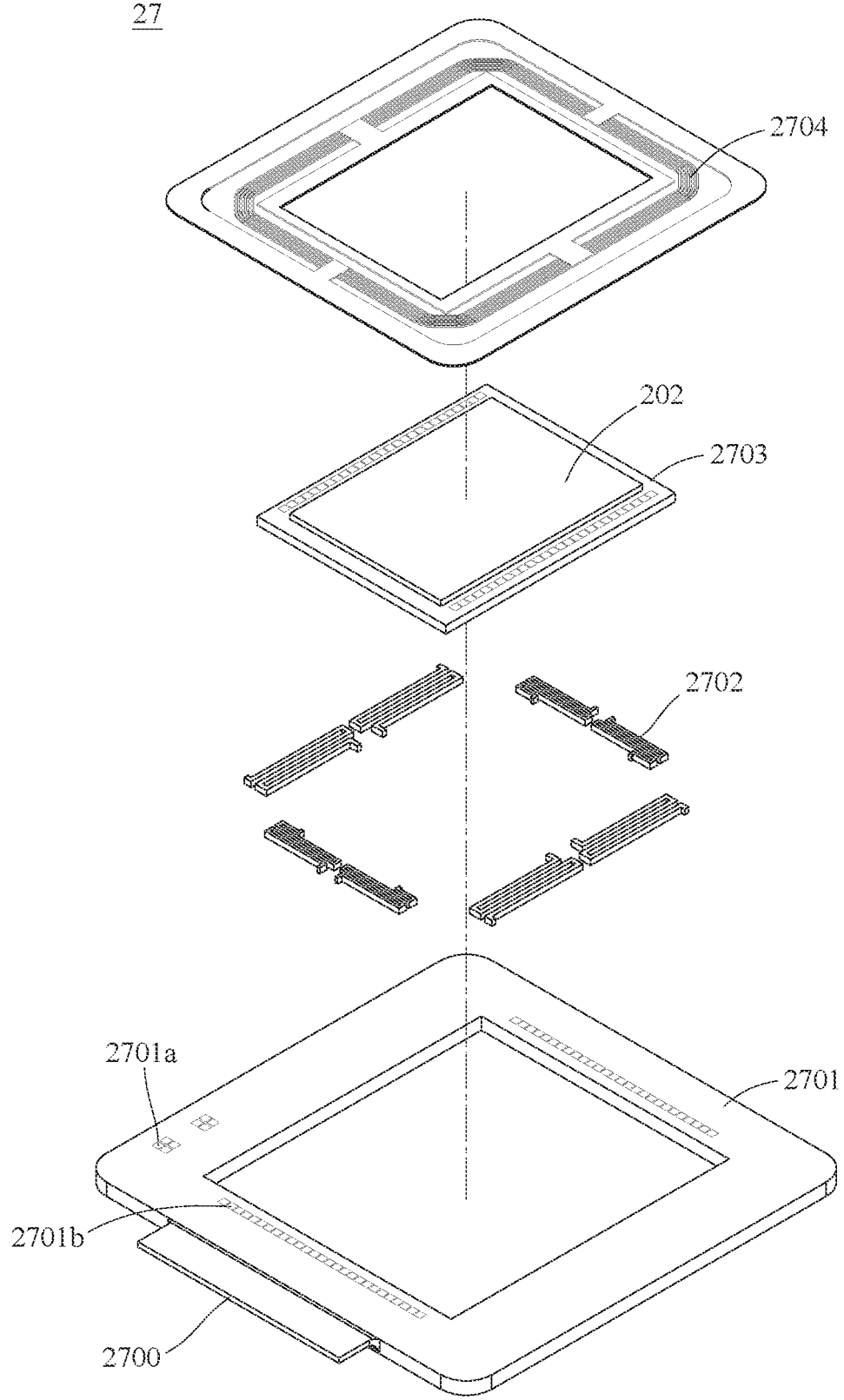
FIG. 22 is an exploded view of a sensing module of the camera module in FIG. 12.

Please refer to FIG. 11 to FIG. 22, where FIG. 11 is a perspective view of a camera module according to the 2nd embodiment of the present disclosure, FIG. 12 is an exploded view of the camera module in FIG. 11, FIG. 13 is an exploded view of an imaging lens of the camera module in FIG. 12, FIG. 14 is a schematic view showing the corresponding relationship among part of components of the imaging lens in FIG. 13, FIG. 15 is another schematic view showing the corresponding relationship among part of components of the imaging lens in FIG. 13, FIG. 16 is a perspective view of the camera module in FIG. 11 that has been partially sectioned, FIG. 17 is an enlarged and aligned section view of EE region of the partially sectioned camera module in FIG. 16, FIG. 18 is an enlarged and aligned section view of GG region of the partially sectioned camera module in FIG. 16, FIG. 19 is an enlarged and aligned section view of HH region of the partially sectioned camera module in FIG. 16, FIG. 20 is an enlarged and aligned section view of II region of the partially sectioned camera module in FIG. 16, FIG. 21 is an enlarged and aligned section view of JJ region of the partially sectioned camera module in FIG. 16, and FIG. 22 is an exploded view of a sensing module of the camera module in FIG. 12.

A camera module 2 provided in this embodiment includes a fixed part 21, a movable part 22, an elastic element 23, an electrical connection element 24, a driving part 25, a filter module 26 and an image sensing module 27.

The fixed part 21 includes a base 2101 and a casing 2102. The base 2101 has connection circuit 2101a that is able to connect external power. The casing 2102 is disposed on the base 2101, and the base 2101 and the casing 2102 together form an accommodation space (not numbered) for accommodating the movable part 22, the elastic element 23, the electrical connection element 24 and the driving part 25.

The movable part 22 is movable with respect to the fixed part 21. In detail, the movable part 22 includes an imaging lens 200 and a plurality of lens elements 2202. The imaging lens 200 has an optical axis 201 and an image surface 202. The optical axis 201 passes through the image surface 202. The lens elements 2202 are accommodated in the imaging lens 200. The elastic element 23 includes a first elastic element 23a and a second elastic element 23b. The first elastic element 23a is connected to and located between the imaging lens 200 of the movable part 22 and the casing 2102 of the fixed part 21, and the second elastic element 23b, as shown in FIG. 19, is connected to and located between the imaging lens 200 of the movable part 22 and the base 2101 of the fixed part 21. As such, the imaging lens 200 has freedom of movement in a direction in parallel with the optical axis 201.

The imaging lens 200 includes a lens carrier 210, a variable through hole assembly 220, a fixed element 230 and a driving mount structure 240.

The lens carrier 210 includes a main part 211, a mount structure 212 and two ferromagnetic elements 213. The main part 211 is provided for the lens elements 2202 to be disposed therein. The mount structure 212 has a slide surface 2123. As shown in FIG. 15, the ferromagnetic elements 213 are fixed in the main part 211.

The variable through hole assembly 220 includes a plurality of movable blades 221, a rotatable element 222, two pairs of electromagnetic pairs 224 and a through hole circuit 225.

The fixed element 230 includes a first fixed element 230a and a second fixed element 230b. The first fixed element 230a is fixed on the lens carrier 210, and the first fixed element 230a and the lens carrier 210 together form an accommodation space (not numbered) therebetween for the rotatable element 222 to be easily assembled therein. The fixed element 230a includes a plurality of post structures 2301. The second fixed element 230b has a plurality of positioning structures 2302 and a plurality of groove structures 2303. The positioning structures 2302 are disposed respectively corresponding to the post structures 2301 of the first fixed element 230a so as to achieve an easy assembly process. Moreover, the second fixed element 230b and the first fixed element 230a form an accommodation space (not numbered) therebetween for the movable blades 211 to be easily assembled therein.

The movable blades 221 have a plurality of rotatable element corresponding holes 2211 and a plurality of fixed element corresponding holes 2213. The movable blades 221 are movably and together surround the optical axis 201 to form a through hole TH, and a size of the through hole TH is variable by movement of the movable blades 221. The through hole TH is disposed at a position where an aperture of the imaging lens 200 is located, such that the through hole TH with a variable size is used as the physical aperture stop of the imaging lens 200. When the size of the through hole TH varies to the maximum, and an f-number of the imaging lens 200 is FNO, the following condition is satisfied: FNO=1.6. Moreover, the lens element 2202 includes a positive lens element 2202p that has positive refractive power and is disposed adjacent to the through hole TH.

The rotatable element 222 includes a plurality of post structures 2221 and has a low-friction-characteristic surface 2222. As shown in FIG. 14 and FIG. 20, the rotatable element 222 is slidably located on the slide surface 2123 of the mount structure 212 through the low-friction-characteristic surface 2222 with the coefficient of kinetic friction therebetween smaller than 0.52 so as to provide freedom of movement of the rotatable element 222 with respect to the lens carrier 210 in a rotation direction taking the optical axis 201 as the rotation axis. The fixed element corresponding holes 2213 of the movable blades 221 are disposed respectively corresponding to the post structures 2301 of the first fixed element 230a. The rotatable element corresponding holes 2211 of the movable blades 221 are disposed respectively corresponding to the post structures 2221 of the rotatable element 222. The relative displacement between the post structures 2301 of the first fixed element 230a and the post structures 2221 of the rotatable element 222 is able to drive the movable blades 221 to rotate and/or to move, thereby driving the movable blades 221 to vary the size of the through hole TH. Moreover, the post structures 2221 of the rotatable element 222 are disposed respectively corresponding to the groove structures 2303 of the second fixed element 230b so as to restrict the rotation path of the rotatable element 222 and prevent the movable blades 221 from being detached from the post structures 2221 of the rotatable element 222.

In this embodiment, the low-friction-characteristic surface 2222 is achieved by coating a low friction coating on the rotatable element 222. Further, the low-friction-characteristic surface 2222 can be a fluoropolymer (e.g., polytetrafluoroethylene) coating, a carbon-based coating (which can refer to diamond-like carbon (DLC), graphite-like carbon (GLC), amorphous carbon, graphene and so on), etc., and the present disclosure is not limited thereto.

In some other embodiments of the present disclosure, the low-friction-characteristic surface may have a plurality of accommodation structures for accommodating a relatively large amount of lubricating material after the lubricating material is disposed thereon and for evenly distributing the lubricating material, thereby further reducing the kinetic friction between the low-friction-characteristic surface and the slide surface. In some other embodiments, the lubricating material may be lubricating oil, but the present disclosure is not limited thereto.

As shown in FIG. 17, the second fixed element 230b has a gap surface 2300. The gap surface 2300 and the rotatable element 222 form a gap GP therebetween, and the movable blades 221 are disposed in the gap GP. When a thickness of the gap GP is TG', and a thickness of each of the movable blades 221 is TB, the following conditions are satisfied: TG'=0.13 [um]; TB=0.08 [um]; and TG'−TB=0.05 [um]. In this embodiment, the arrangement manner of the movable blades 221 shown in FIG. 13, which are disposed through the rotatable element corresponding holes 2211 and the fixed element corresponding holes 2213, is not intended to restrict the present disclosure. In some other embodiment of the present disclosure, the first fixed element or the rotatable element can also have an abut surface where the movable blades are disposed thereon, and a value of arithmetical mean roughness (Ra) of the abut surface is smaller than 0.25 micrometers.

The two pairs of electromagnetic pairs 224 are disposed symmetric to each other. Each electromagnetic pair 224 includes a through hole magnet 2241 and a through hole coil 2242. As shown in FIG. 13, FIG. 15, and FIG. 18, the through hole magnets 2241 are disposed in recesses (not numbered) of the rotatable element 222 and corresponding to the ferromagnetic elements 213 that partially surround the optical axis 201. As shown in FIG. 13 and FIG. 18, in each electromagnetic pair 224, the through hole coil 2242 is disposed opposite to the through hole magnet 2241.

The through hole circuit 225 is electrically connected to the through hole coils 2242 so as to provide electricity for driving the rotatable element 222 to rotate. The through hole circuit 225 includes a through hole controller 2251, a position sensor 2253 and a plurality of circuit contacts 2252. The through hole controller 2251 includes a control circuit (not numbered). The through hole controller 2251 is disposed at the center of one of the through hole coils 2242. The control circuit of the through hole controller 2251 controls the through hole coils 2242 so as to generate magnetic field for driving the rotatable element 222 to rotate. As shown in FIG. 13 and FIG. 18, the position sensing circuit included in the position sensor 2253 at the center of the other one of the through hole coils 2242 is disposed opposite to one of the through hole magnets 2241 so as to sense changes in the magnetic field of the through hole magnets 2241, thereby obtaining position information of the rotatable element 222. The through hole circuit 225 is electrically connected to external power via the circuit contacts 2252 so as to provide electricity and signals for the variable through hole assembly 220.

The electrical connection element 24 includes a plurality of conductive routes (not numbered). As shown in FIG. 19, the conductive routes of the electrical connection element 24 are electrically connected to the circuit contacts 2252 of the through hole circuit 225 and the connection circuit 2101a of the base 2101 of the fixed part 21, such that electrical signals are transmittable therethrough. Further, with the electrical connection between the connection circuit 2101a and the external power, the camera module 2 can be applied to an electronic device for controlling the size of the aperture thereof. Moreover, the elastic modulus of the electrical connection element 24 is smaller than the elastic modulus of the elastic element 23 in a direction in parallel with the optical axis 201.

The driving mount structure 240 is disposed on the main part 211 of the lens carrier 210.

The driving part 25 includes four driving magnets 2502 and a driving coil 2503. The driving magnets 2502 are disposed in the casing 2102. The driving coil 2503 is disposed on the driving mount structure 240. As shown in FIG. 12 and FIG. 19, the driving coil 2503 is disposed opposite to the driving magnets 2502, and the driving coil 2503 is electrically connected to the through hole circuit 225 and the electrical connection element 24 so as to drive the main part 211 together with the imaging lens 200 to move in a direction in parallel with the optical axis 201 for achieving a focusing function.

The filter module 26 includes a filter frame 2601 and a filter element 2602. The filter frame 2601 is disposed at a side of the base 2101 located away from the casing 2102. The filter frame 2601 has a connection circuit 2601a and an opening 2601b. The connection circuit 2601a is electrically connected to the connection circuit 2101a, and as shown in FIG. 19 and FIG. 21, the connection circuit 2101a is able to connect external power via the connection circuit 2601a. The filter element 2602 is disposed in the opening 2601b of the filter frame 2601, and the filter element 2602 is able for making imaging light to pass through so as to filter light with particular wavelengths.

The image sensing module 27 includes, as shown in FIG. 21 and FIG. 22, an access contact 2700, an image sensing frame 2701, a plurality of image sensing elastic elements 2702, an image sensor 2703 and an image sensing electrical connection element 2704.

The access contact 2700 is disposed on the image sensing frame 2701 for connecting external power.

The imaging sensing frame 2701 is disposed on a side of the filter frame 2601 located away from the base 2101. The imaging sensing frame 2701 has a plurality of base contacts 2701a and a plurality of image sensing contacts 2701b. The base contacts 2701a are electrically connected to the access contact 2700, the connection circuit 2601a of the filter frame 2601 and the connection circuit 2101a of the base 2101 so as to provide external power for the through hole coils 2242, the through hole circuit 225, the electrical connection element 24 and the driving coil 2503. The image sensing contacts 2701b are electrically connected to the access contact 2700.

The image sensing elastic elements 2702 are mechanically connected to and located between the imaging sensing frame 2701 and the image sensor 2703 so as to provide freedom of movement of the image sensor 2703 with respect to the image sensing frame 2701 in a direction perpendicular to the optical axis 201.

The image sensor 2703 is disposed on the image surface 202 of the image lens 200.

The image sensing electrical connection element 2704 is electrically connected to the image sensor 2703 and the image sensing contacts 2701b so as to transmit obtained image signals to external.

In this embodiment, an anti-shake function can be achieved by moving the image sensor 2703. A voice coil motor (VCM), shape memory alloys (SMA) or a piezoelectric material can be disposed between the image sensor 2703 and the image sensing frame 2701 so as to provide a driving force required to move the image sensor 2703, but the present disclosure is not limited thereto.

A distance between the optical axis 201 of the imaging lens 200 and a position of the image sensor 2703 located furthest away from the optical axis 201 of the imaging lens 200 is defined as a maximum image height. When the maximum image height is ImgH, the following condition is satisfied: ImgH=3.1 [mm].

The imaging lens 200 has a maximum field of view corresponding to the maximum image height ImgH. When the maximum field of view is FOV, the following condition is satisfied: FOV=46.1 [deg.].

3rd Embodiment

Figure 23:
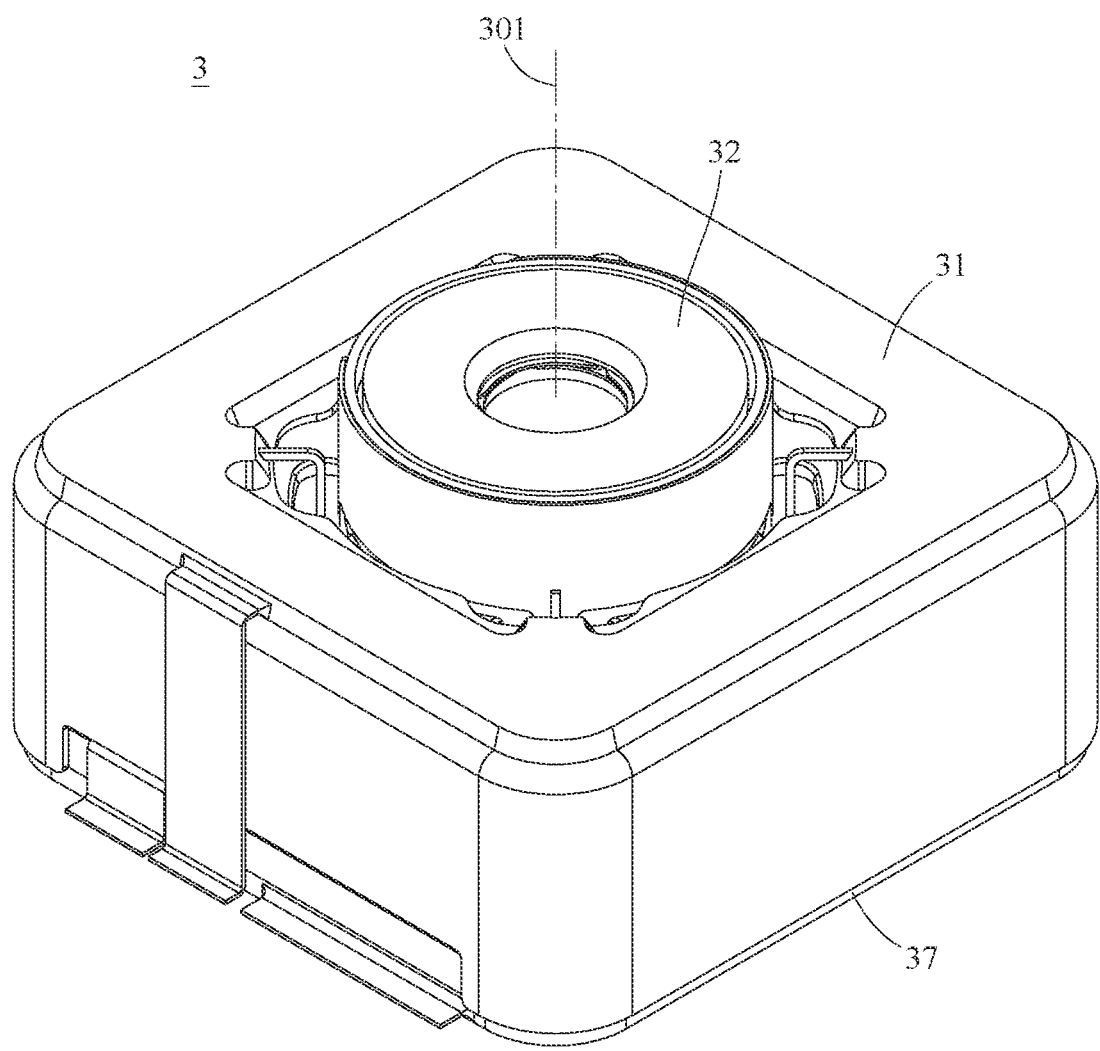
FIG. 23 is a perspective view of a camera module according to the 3rd embodiment of the present disclosure.
Figure 24:
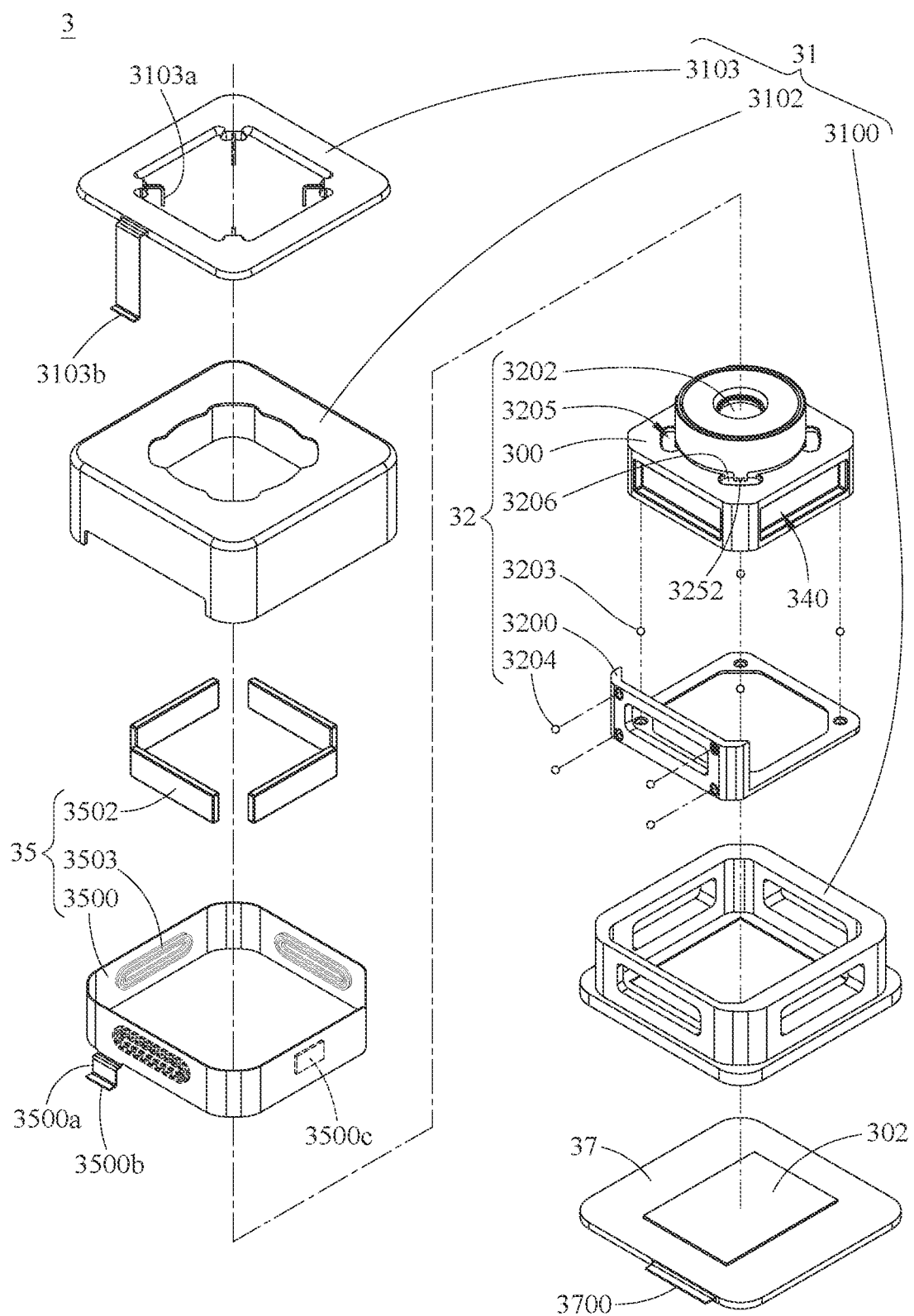
FIG. 24 is an exploded view of the camera module in FIG. 23.
Figure 25:
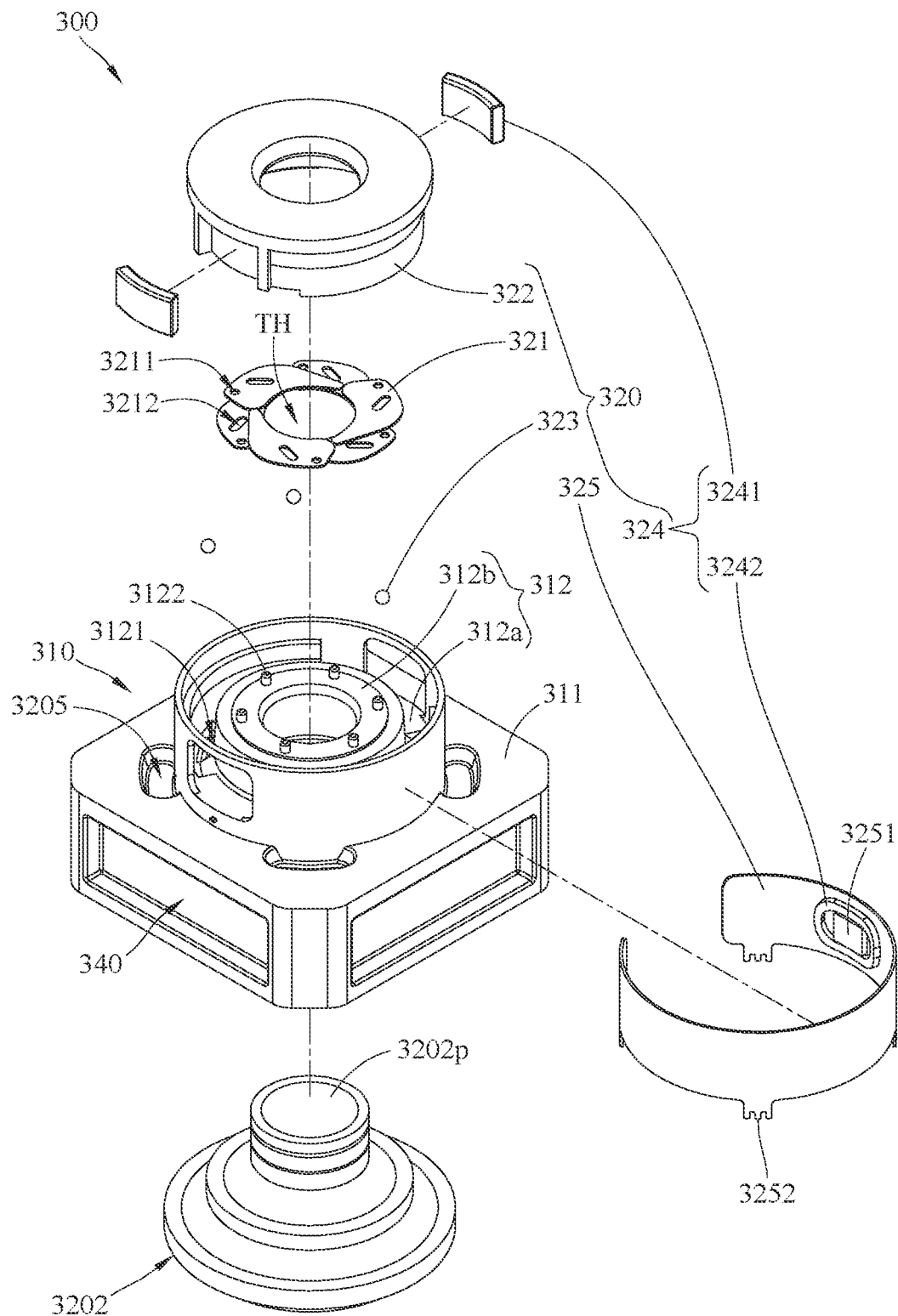
FIG. 25 is an exploded view of an imaging lens of the camera module in FIG. 24.
Figure 26:
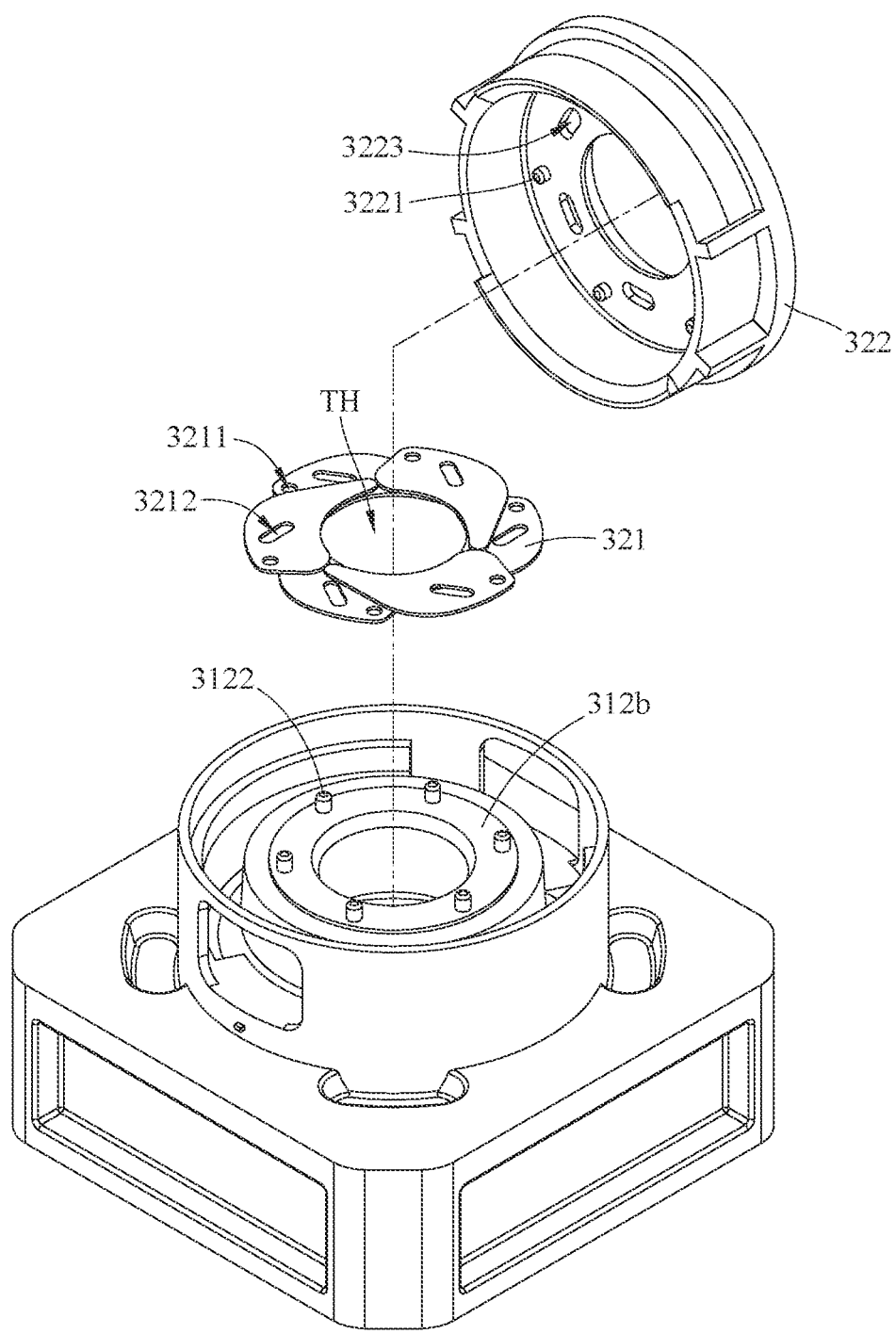
FIG. 26 is a schematic view showing the corresponding relationship among part of components of the imaging lens in FIG. 24.
Figure 27:
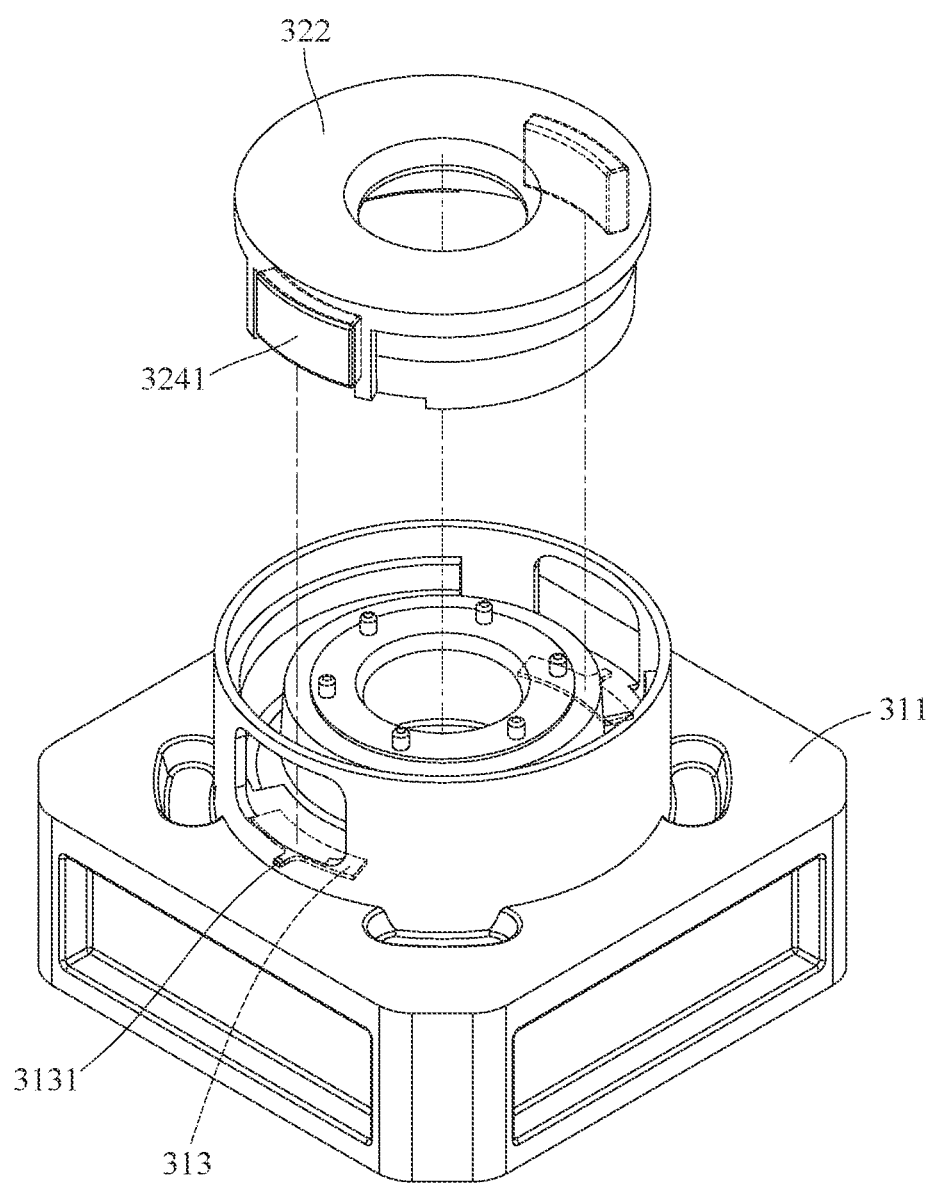
FIG. 27 is another schematic view showing the corresponding relationship among part of components of the imaging lens in FIG. 24.
Figure 28:
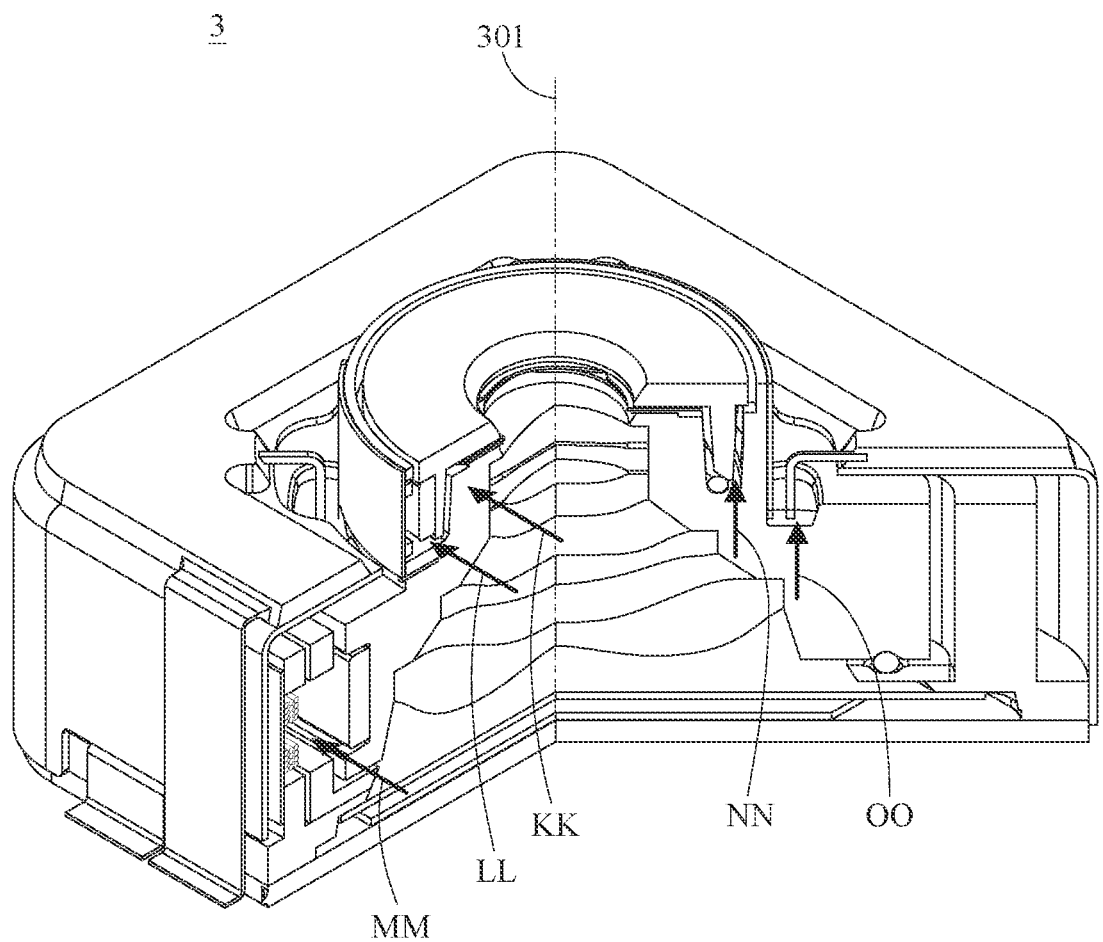
FIG. 28 is a perspective view of the camera module in FIG. 23 that has been partially sectioned.
Figure 29:
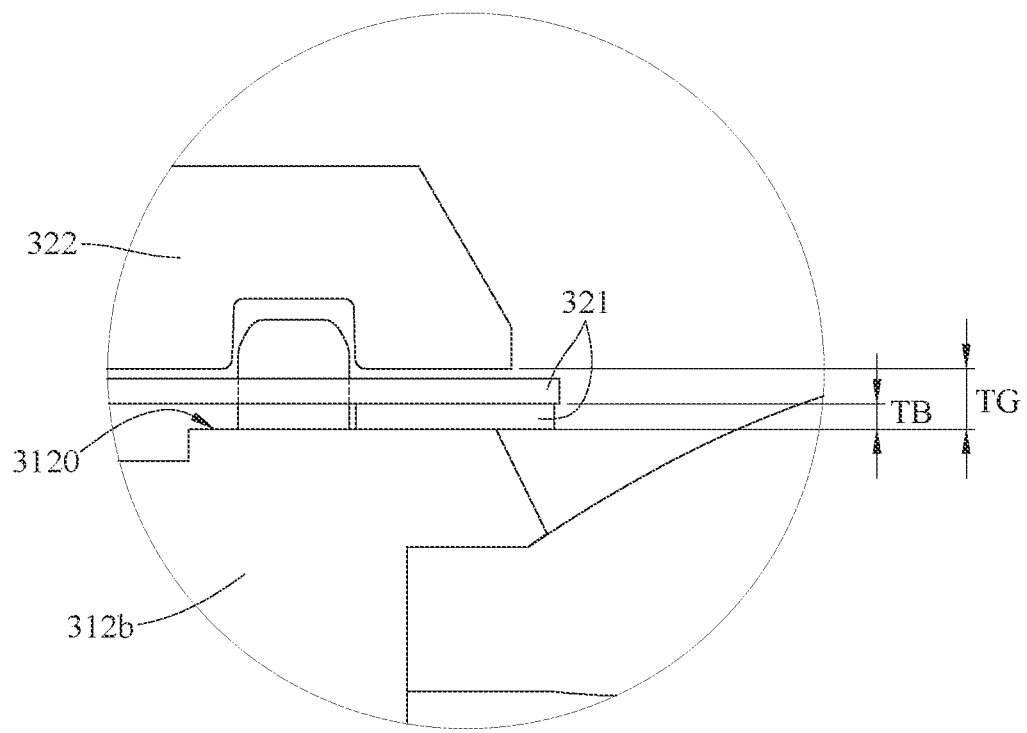
FIG. 29 is an enlarged and aligned section view of KK region of the partially sectioned camera module in FIG. 28.
Figure 30:
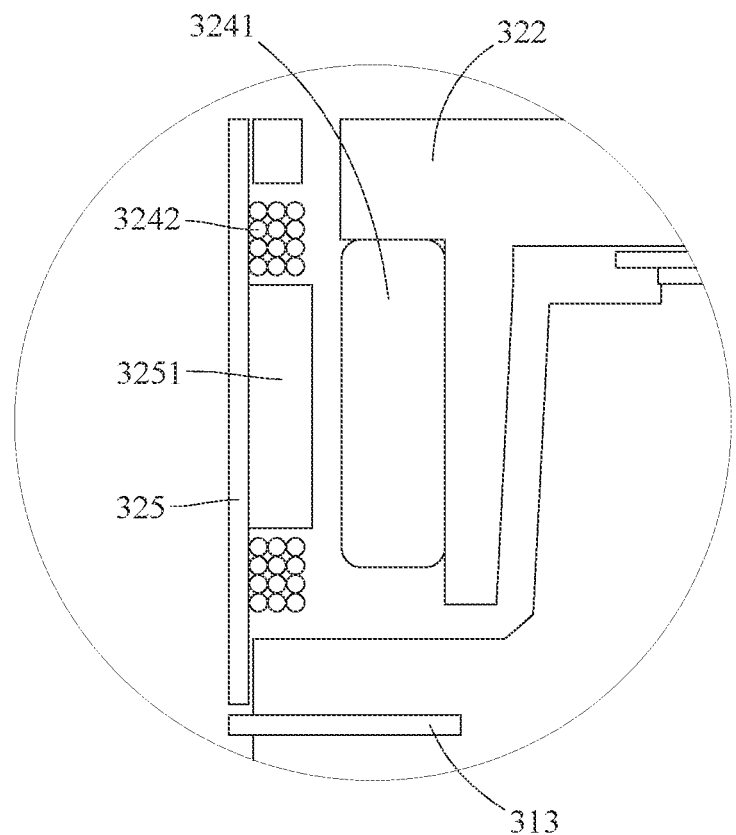
FIG. 30 is an enlarged and aligned section view of LL region of the partially sectioned camera module in FIG. 28.
Figure 31:
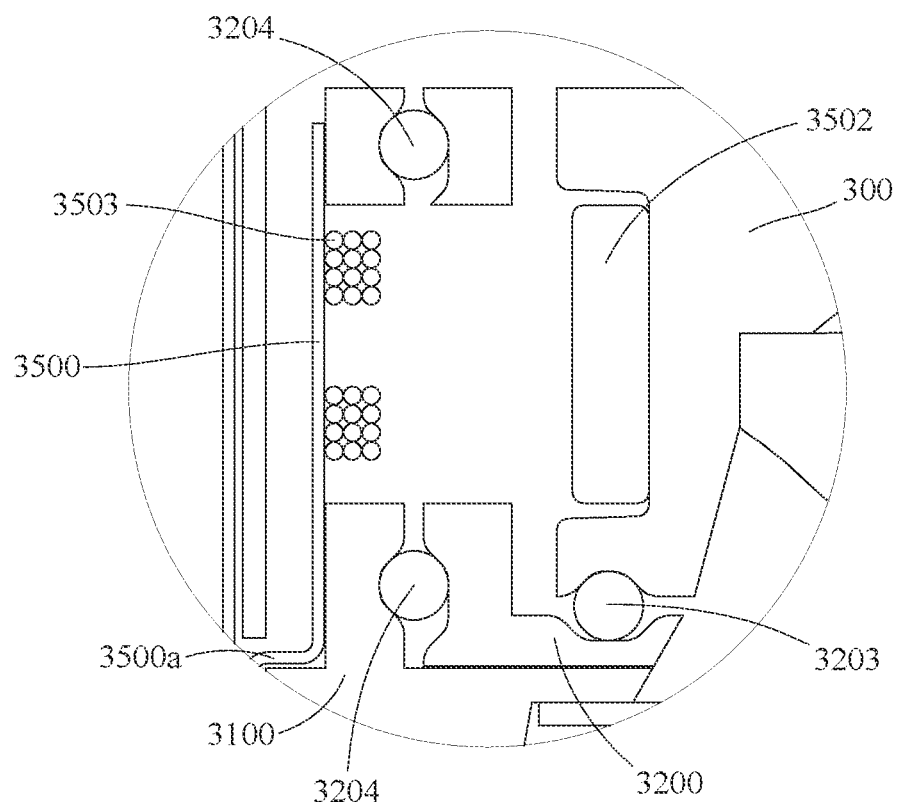
FIG. 31 is an enlarged and aligned section view of MM region of the partially sectioned camera module in FIG. 28.
Figure 32:
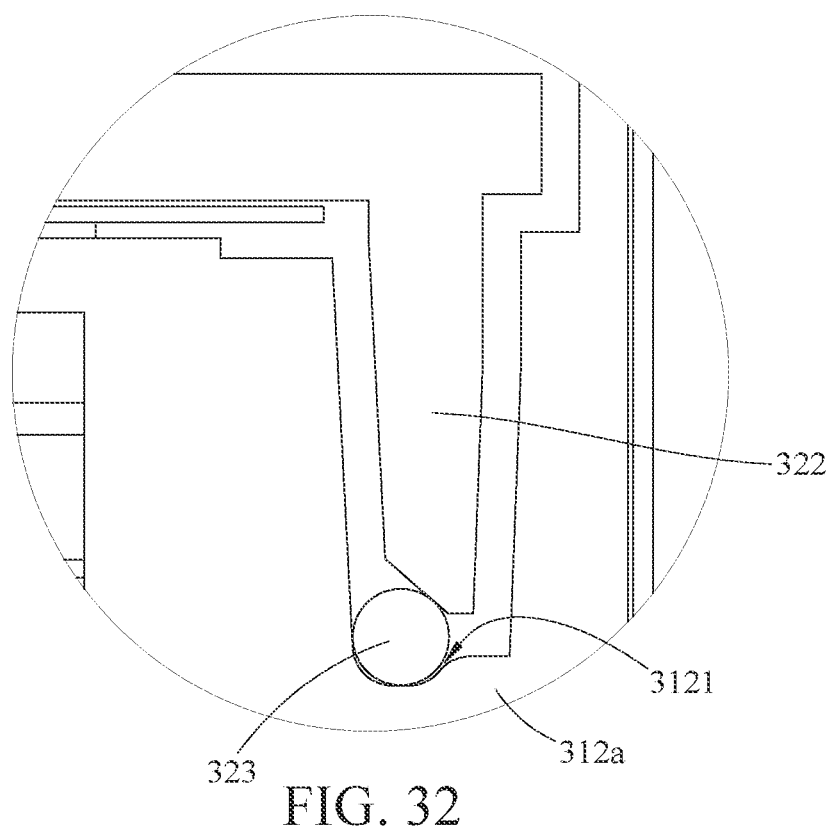
FIG. 32 is an enlarged and aligned section view of NN region of the partially sectioned camera module in FIG. 28.
Figure 33:
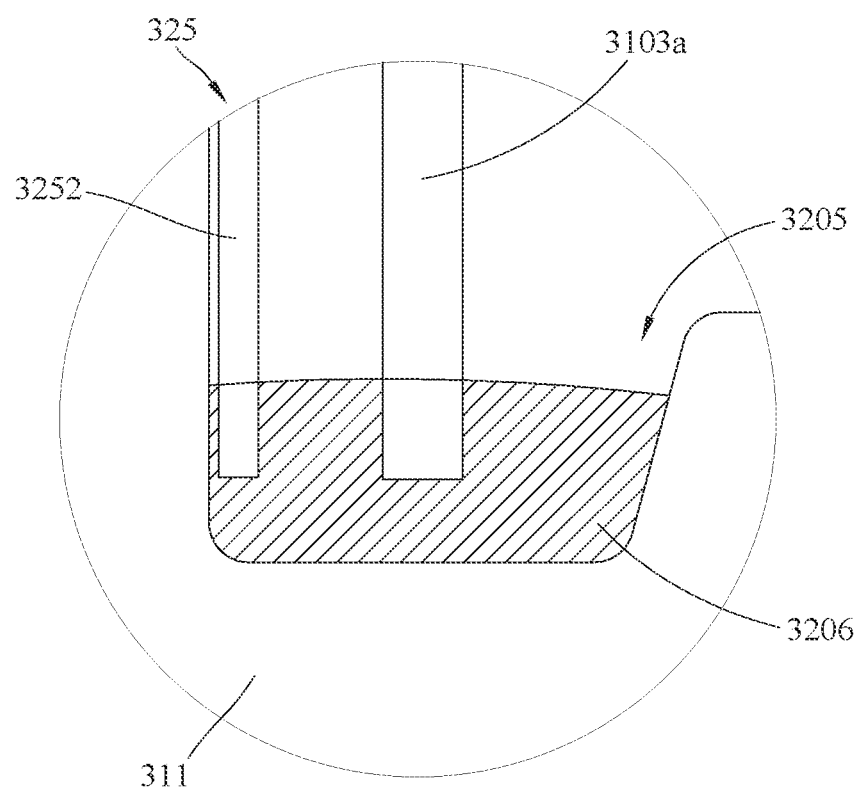
FIG. 33 is an enlarged and aligned section view of OO region of the partially sectioned camera module in FIG. 28.

Please refer to FIG. 23 to FIG. 33, where FIG. 23 is a perspective view of a camera module according to the 3rd embodiment of the present disclosure, FIG. 24 is an exploded view of the camera module in FIG. 23, FIG. 25 is an exploded view of an imaging lens of the camera module in FIG. 24, FIG. 26 is a schematic view showing the corresponding relationship among part of components of the imaging lens in FIG. 24, FIG. 27 is another schematic view showing the corresponding relationship among part of components of the imaging lens in FIG. 24, FIG. 28 is a perspective view of the camera module in FIG. 23 that has been partially sectioned, FIG. 29 is an enlarged and aligned section view of KK region of the partially sectioned camera module in FIG. 28, FIG. 30 is an enlarged and aligned section view of LL region of the partially sectioned camera module in FIG. 28, FIG. 31 is an enlarged and aligned section view of MM region of the partially sectioned camera module in FIG. 28, FIG. 32 is an enlarged and aligned section view of NN region of the partially sectioned camera module in FIG. 28, and FIG. 33 is an enlarged and aligned section view of OO region of the partially sectioned camera module in FIG. 28.

A camera module 3 provided in this embodiment includes a fixed part 31, a movable part 32, a driving part 35 and an image sensor 37.

The fixed part 31 includes a fixed part frame 3100, a casing 3102 and a conductive terminal element 3103. The casing 3102 is disposed on the fixed part frame 3100, and the fixed part frame 3100 and the casing 3102 together form an accommodation space (not numbered) for accommodating the movable part 32 and the driving part 35. The conductive terminal element 3103 is disposed at a side of the casing 3102 located away from the fixed part frame 3100. The conductive terminal element 3103 has a plurality of conductive terminals 3103a and an access contact 3103b that are electrically connected to each other.

The movable part 32 is movable with respect to the fixed part 31. In detail, the movable part 32 includes a movable part frame 3200, an imaging lens 300, a plurality of lens elements 3202, a plurality of first rollable elements 3203, a plurality of second rollable elements 3204, a plurality of groove structures 3205 and a plurality of conductive colloids 3206. The imaging lens 300 is accommodated in the movable part frame 3200. The imaging lens 300 has an optical axis 301 and an image surface 302. The optical axis 301 passes through the image surface 302. The lens elements 3202 are accommodated in the imaging lens 300. As shown in FIG. 24 and FIG. 31, the first rollable elements 3203 are in contact with and located between the movable part frame 3200 and the imaging lens 300, such that the imaging lens 300 has freedom of movement in a direction perpendicular to the optical axis 301. As shown in FIG. 24 and FIG. 31, the second rollable elements 3204 are in contact with and located between the fixed part frame 3100 and the movable part frame 3200, such that the imaging lens 300 has freedom of movement in a direction in parallel with the optical axis 301.

The imaging lens 300 includes a lens carrier 310, a variable through hole assembly 320 and four driving mount structures 340.

The lens carrier 310 includes a main part 311, a mount structure 312 and two ferromagnetic elements 313. The main part 311 is provided for the lens elements 3202 to be disposed therein. The mount structure 312 includes a first mount structure 312a and a second mount structure 312b. As shown in FIG. 25 and FIG. 32, the first mount structure 312a has a plurality of grooves 3121. As shown in FIG. 25, the second mount structure 312b includes a plurality of post structures 3122. As shown in FIG. 27, the ferromagnetic elements 313 have securing structures 3131. The ferromagnetic elements 313 are fixed in the main part 311 through the securing structures 3131.

The variable through hole assembly 320 includes a plurality of movable blades 321, a rotatable element 322, three spherical rollable elements 323, two pairs of electromagnetic pairs 324 and a through hole circuit 325.

The movable blades 321 have a plurality of rotatable element corresponding holes 3211 and a plurality of lens carrier corresponding holes 3212. The movable blades 321 are movably and together surround the optical axis 301 to form a through hole TH, and a size of the through hole TH is variable by movement of the movable blades 321. The through hole TH is disposed at a position where an aperture of the imaging lens 300 is located, such that the through hole TH with a variable size is used as the physical aperture stop of the imaging lens 300. When the size of the through hole TH varies to the maximum, and an f-number of the imaging lens 300 is FNO, the following condition is satisfied: FNO=2.25. Moreover, the lens element 3202 includes a positive lens element 3202p that has positive refractive power and is disposed adjacent to the through hole TH.

The rotatable element 322 includes a plurality of post structures 3221 and a plurality of trench structures 3223. As shown in FIG. 25 and FIG. 32, the rollable elements 323 are disposed in the grooves 3121 and arranged surrounding the through hole TH. The rollable elements 323 disposed between the first mount structure 312a and the rotatable element 322 are able to provide freedom of movement of the rotatable element 322 with respect to the lens carrier 310 in a rotation direction taking the optical axis 301 as the rotation axis. As shown in FIG. 25 and FIG. 26, the lens carrier corresponding holes 3212 of the movable blades 321 are disposed respectively corresponding to the post structures 3122 of the second mount structure 312b. As shown in FIG. 26, the rotatable element corresponding holes 3211 of the movable blades 321 are disposed respectively corresponding to the post structures 3221 of the rotatable element 322. The relative displacement between the post structures 3122 of the second mount structure 312b and the post structures 3221 of the rotatable element 322 is able to drive the movable blades 321 to rotate and/or to move, thereby driving the movable blades 321 to vary the size of the through hole TH. Moreover, as shown in FIG. 26, the post structures 3122 of the second mount structure 312b are disposed respectively corresponding to the trench structures 3223 of the rotatable element 322 so as to restrict the rotation path of the rotatable element 322 and prevent the movable blades 321 from being detached from the post structures 3122 of the second mount structure 312b.

As shown in FIG. 29, the second mount structure 312b has a gap surface 3120. The gap surface 3120 and the rotatable element 322 form a gap GP therebetween, and the movable blades 321 are disposed in the gap GP. When a thickness of the gap GP is TG, and a thickness of each of the movable blades 321 is TB, the following conditions are satisfied: TG=0.19 [um]; TB=0.08 [um]; and TG−TB=0.11 [um]. In this embodiment, the gap GP in some cases is able to accommodate two stacked movable blades 321 simultaneously. In this embodiment, the arrangement manner of the movable blades 321 shown in FIG. 25 and FIG. 26, which are disposed through the rotatable element corresponding holes 3211 and the lens carrier corresponding holes 3212, is not intended to restrict the present disclosure. In some other embodiment of the present disclosure, the second mount structure can also have an abut surface where the movable blades are disposed thereon, and a value of arithmetical mean roughness (Ra) of the abut surface is smaller than 0.25 micrometers.

The two pairs of electromagnetic pairs 324 are disposed symmetric to each other. Each electromagnetic pair 324 includes a through hole magnet 3241 and a through hole coil 3242. As shown in FIG. 25, FIG. 27, and FIG. 30, the through hole magnets 3241 are disposed in recesses (not numbered) of the rotatable element 322 and corresponding to the ferromagnetic elements 313 that partially surround the optical axis 301. As shown in FIG. 30, in each electromagnetic pair 324, the through hole coil 3242 is disposed opposite to the through hole magnet 3241.

The through hole circuit 325 is electrically connected to the through hole coils 3242 so as to provide electricity for driving the rotatable element 322 to rotate. The through hole circuit 325 includes two through hole controllers 3251 and a plurality of circuit contacts 3252. The through hole controllers 3251 each integrate a control circuit and a position sensing circuit (not numbered). The through hole controllers 3251 are disposed at the centers of the through hole coils 3242. The control circuits of the through hole controllers 3251 control the through hole coils 3242 so as to generate magnetic field for driving the rotatable element 322 to rotate. As shown in FIG. 30, the position sensing circuits of the through hole controllers 3251 are disposed opposite to the through hole magnets 3241 so as to sense changes in the magnetic field of the through hole magnets 3241, thereby obtaining position information of the rotatable element 322. The through hole circuit 325 is electrically connected to external power via the circuit contacts 3252 so as to provide electricity and signals for the variable through hole assembly 320.

Specifically, the groove structures 3205 are located on the main part 311 of the lens carrier 310. As shown in FIG. 33, the conductive colloids 3206 are disposed in the groove structures 3205. The conductive terminals 3103a extend to the conductive colloids 3206. The circuit contacts 3252 of the through hole circuit 325 are electrically connected to external power via the conductive colloids 3206, the conductive terminals 3103a and the access contact 3103b.

The driving mount structures 340 are disposed on the main part 311 of the lens carrier 310.

The driving part 35 includes a driving part frame 3500, four driving magnets 3502 and three driving coils 3503. The driving part frame 3500 has a driving circuit 3500a, an access contact 3500b and a driving controller 3500c. The driving coils 3502 are disposed on the driving mount structure 340. The driving coils 3503 are disposed on the driving part frame 3500. As shown in FIG. 31, the driving coils 3503 are disposed opposite to the driving magnets 3502 and are electrically connected to the driving circuit 3500a and the access contact 3500b so as to connect external power. Moreover, the driving controller 3500c is electrically connected to the driving circuit 3500a and controls the driving coils 3503 via the driving circuit 3500a so as to generate a magnetic field required for moving the main part 311.

According to different directions formed between magnetic poles among the driving magnets 3502, the imaging lens 300 is movable in a direction in parallel with the optical axis 301 so as to achieve a focus function, or the imaging lens 300 is movable in a direction perpendicular to the optical axis 301 so as to achieve an anti-shake function. In specifically, as shown in FIG. 24 and FIG. 31, two of the driving coils 3503 are collaborated with two of the driving magnets 3052 so as to provide a driving force for moving the imaging lens 300 in a direction perpendicular to the optical axis 301. Another one of the driving coils 3503 is collaborated with another one of the driving magnets 3502 so as to provide a driving force for moving the imaging lens 300 in a direction in parallel with the optical axis 301. The other one of the driving magnet 3502 not collaborated with any driving coil 3503 is disposed corresponding to the position sensing circuit of the driving controller 3500c so as to detect the position of the imaging lens 300. However, the above-mentioned magnetic configuration is only exemplary, and the present disclosure is not limited thereto.

The image sensor 37 is disposed on the image surface 302 and at a side of the fixed part frame 3100 located away from the casing 3102. The image sensor 37 has an access contact 3700 for connecting external power.

A distance between the optical axis 301 of the imaging lens 300 and a position of the image sensor 37 located furthest away from the optical axis 301 of the imaging lens 300 is defined as a maximum image height. When the maximum image height is ImgH, the following condition is satisfied: ImgH=3.28 [mm].

The imaging lens 300 has a maximum field of view corresponding to the maximum image height ImgH. When the maximum field of view is FOV, the following condition is satisfied: FOV=80.4 [deg.].

4th Embodiment

Figure 34:
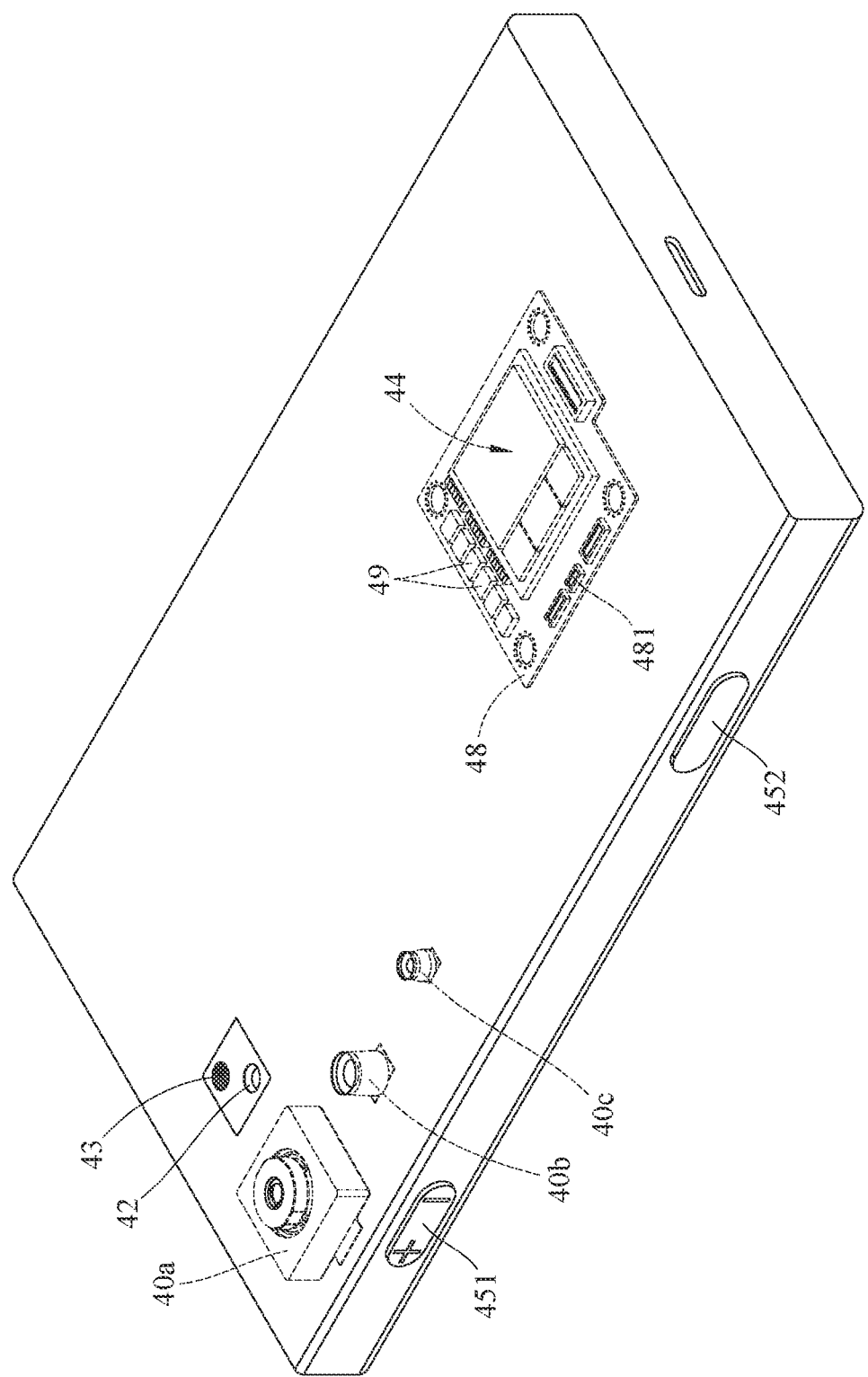
FIG. 34 is one perspective view of an electronic device according to the 4th embodiment of the present disclosure.
Figure 35:
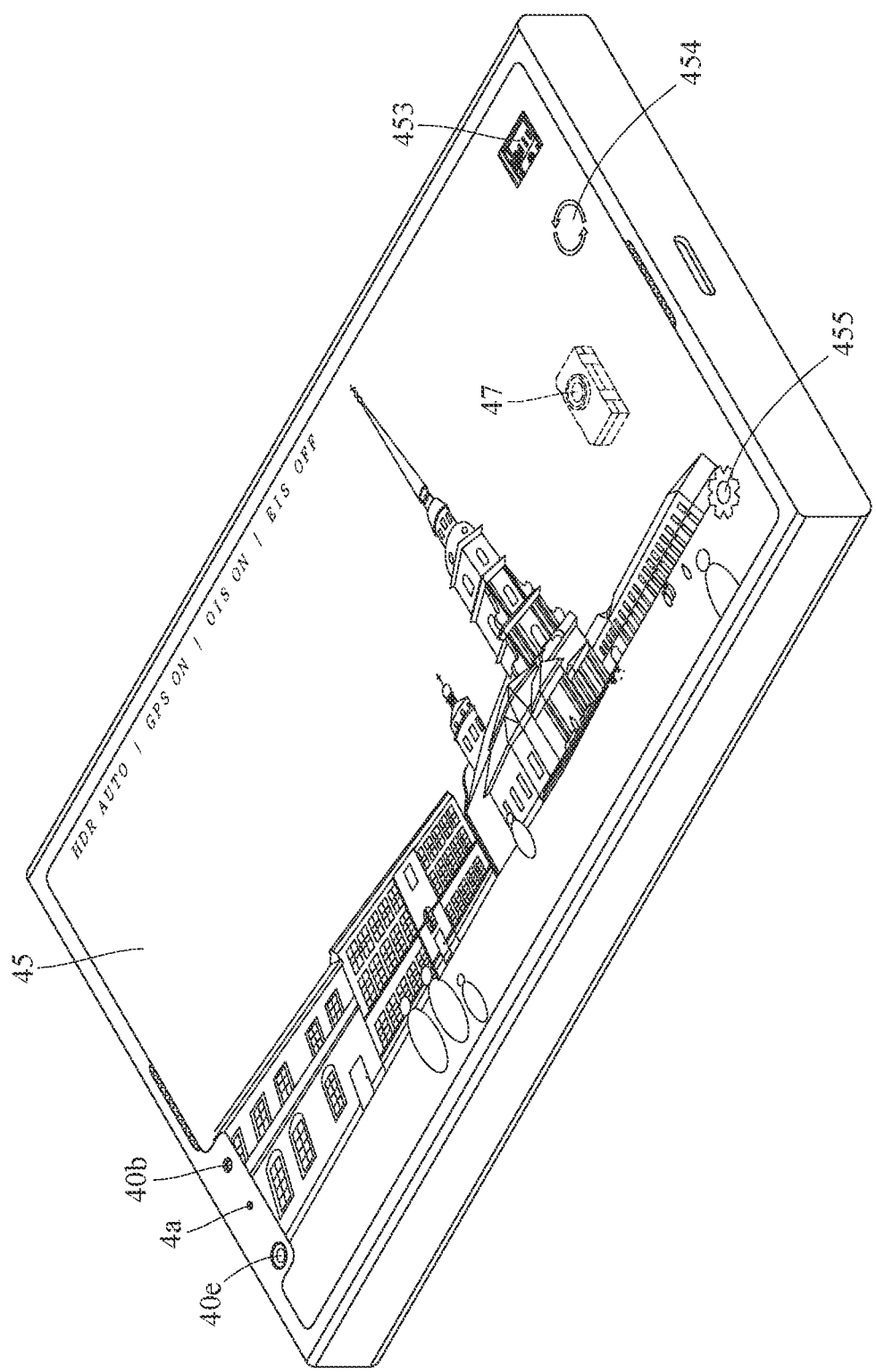
FIG. 35 is another perspective view of the electronic device in FIG. 34.
Figure 36:
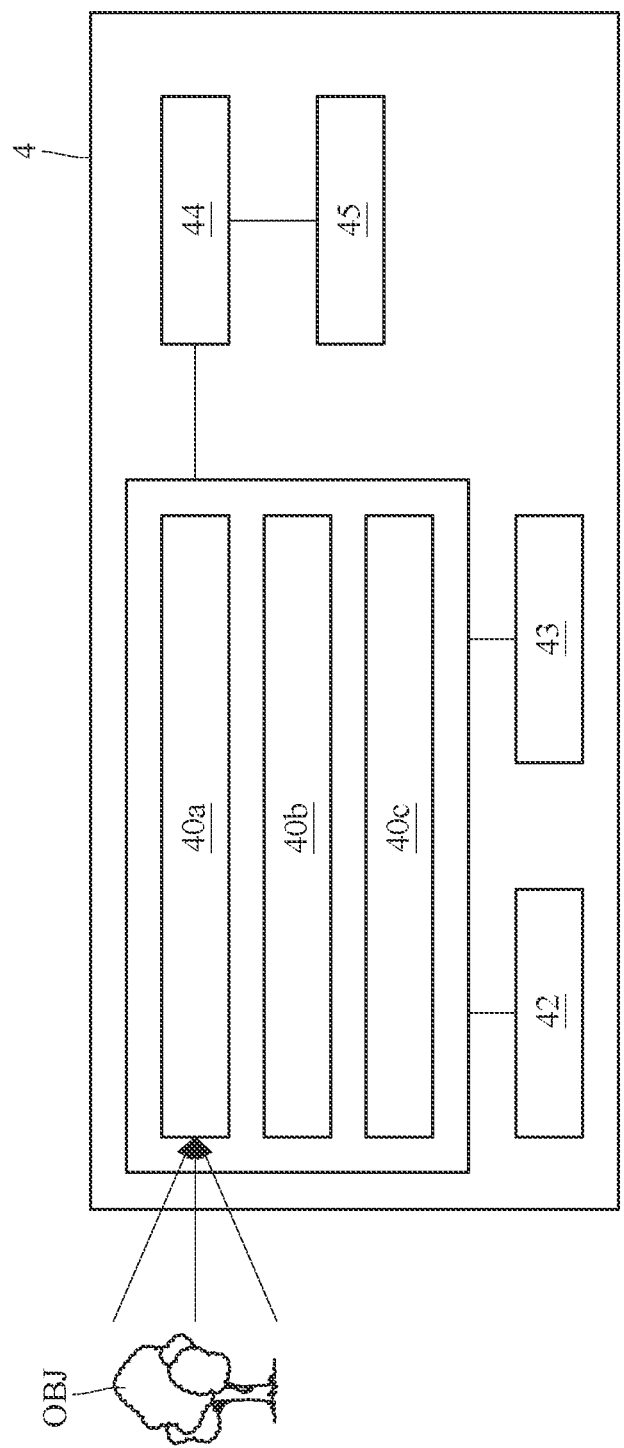
FIG. 36 is a block diagram of the electronic device in FIG. 34.

Please refer to FIG. 34 to FIG. 36, where FIG. 34 is one perspective view of an electronic device according to the 4th embodiment of the present disclosure, FIG. 35 is another perspective view of the electronic device in FIG. 34, and FIG. 36 is a block diagram of the electronic device in FIG. 34.

In this embodiment, an electronic device 4 is a mobile device such as a computer, a smartphone, a smart wearable device, a camera drone, a driving recorder and displayer, and the present disclosure is not limited thereto. The electronic device 4 includes a camera module 40a having a variable aperture stop, a wide-angle camera module 40b, a macro-photo camera module 40c, a compact camera module 40d, a ToF (time of flight) camera module 40e, a flash module 42, a focus assist module 43, an image signal processor (not numbered), a display module 45, an image software processor (not numbered) and a biometric identification device 47. In addition, the camera module 40a a having variable aperture stop is, for example, the camera module 1 as disclosed in the 1st embodiment, but the present disclosure is not limited thereto. Each of the camera modules 40b, 40c, 40d and 40e may be one of the camera modules as disclosed in the above embodiments of the present disclosure.

The camera module 40a, the camera module 40b and the camera module 40c are disposed on the same side of the electronic device 4. The camera module 40d, the ToF camera module 40e and the display module 45 are disposed on the opposite side of the electronic device 4. The display module 45 can be a user interface, such that the camera module 40d and the camera module 40e can be front-facing cameras of the electronic device 4 for taking selfies, but the present disclosure is not limited thereto.

Figure 37:
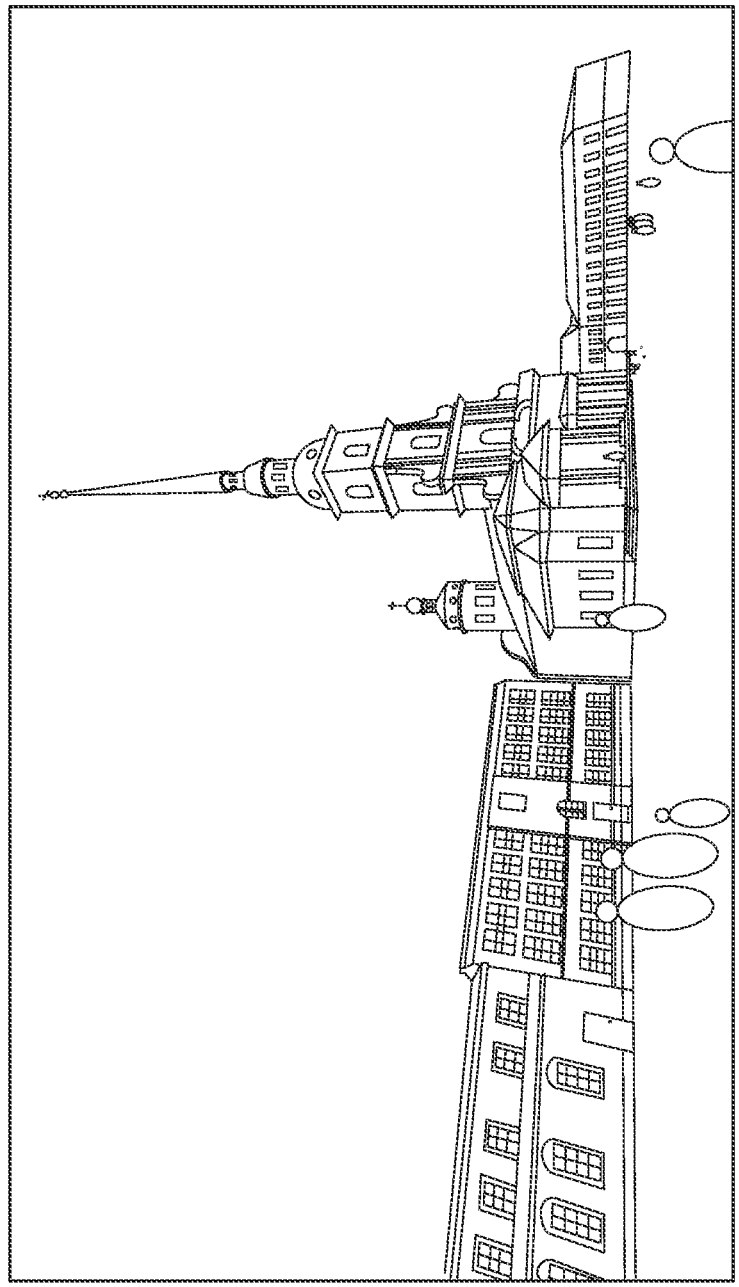
FIG. 37 shows an image captured by the electronic device using a wide-angle camera module in FIG. 34.
Figure 38:
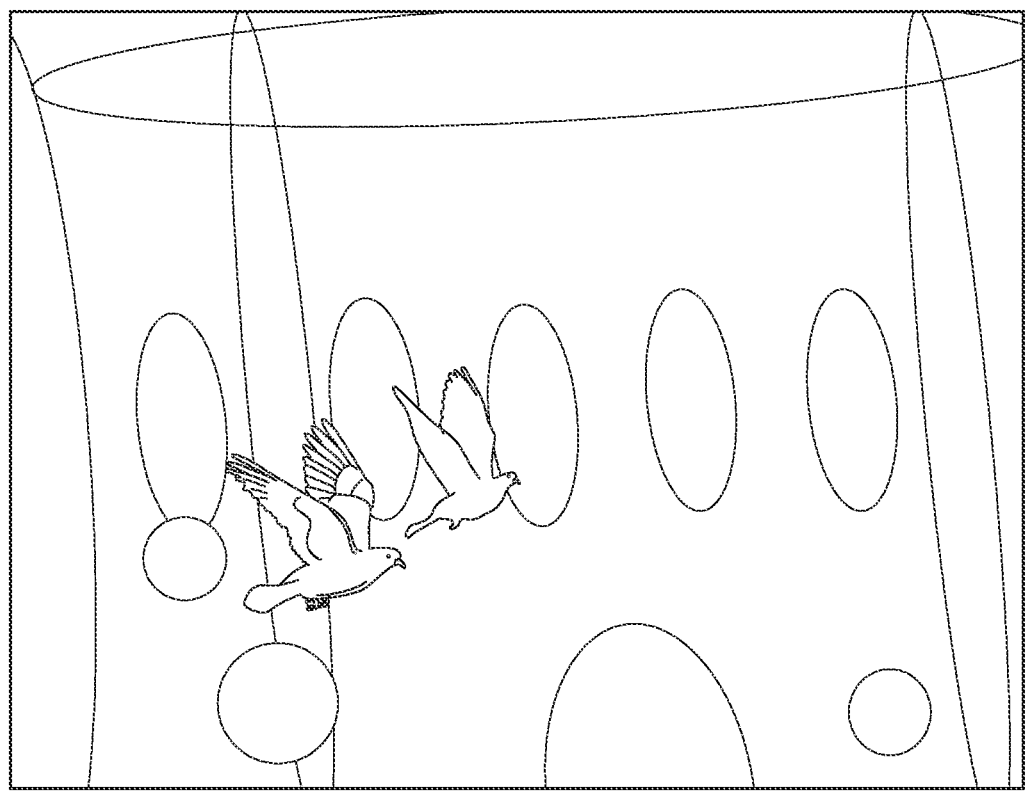
FIG. 38 shows an image captured by the electronic device using a camera module having a variable aperture stop in FIG. 34 with an f-number of 1.4.
Figure 39:
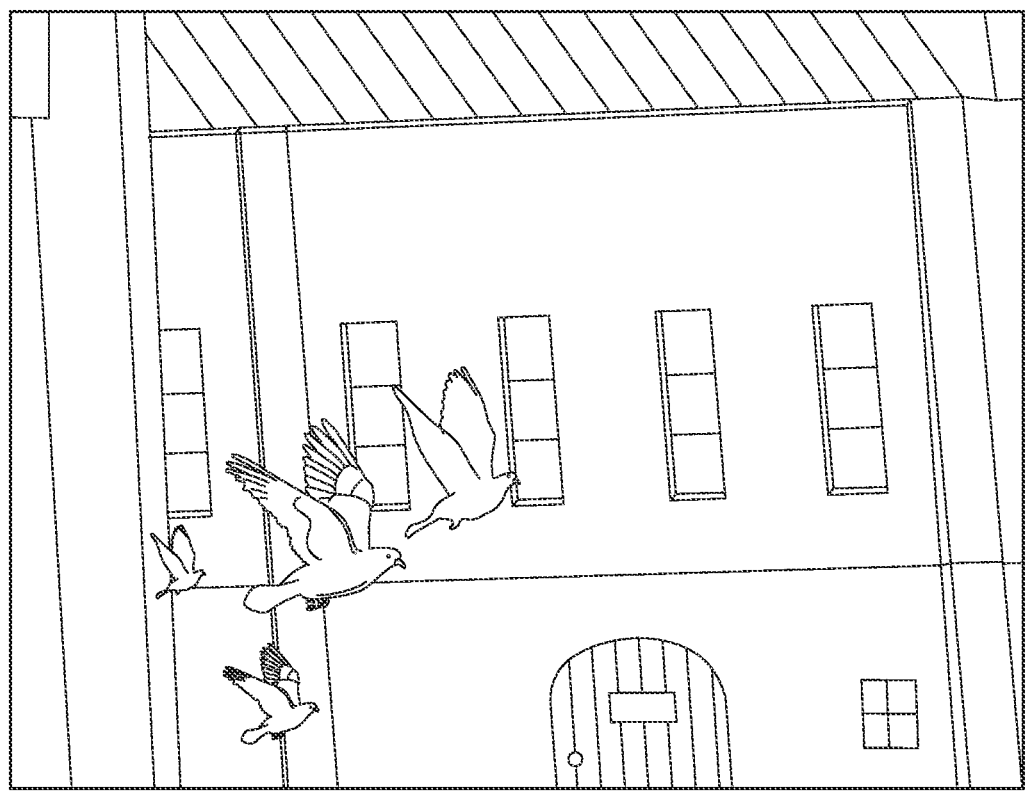
FIG. 39 shows an image captured by the electronic device using a camera module having a variable aperture stop in FIG. 34 with an f-number of 5.6.

In this embodiment, the camera module 40a, the camera module 40b and the camera module 40c have different fields of view, such that the electronic device 4 can have various magnification ratios so as to meet the requirement of optical zoom functionality. For example, the wide-angle camera module 40b has a relatively large field of view, and the image captured by the wide-angle camera module 40b can refer to FIG. 37, which shows an image captured by the electronic device 4 with a wide-angle camera module 40b, and the captured image as shown in FIG. 37 includes the whole cathedral, surrounding buildings and people in front of the cathedral. The captured image as shown in FIG. 37 has a relatively large field of view and depth of view, but it often has a relatively large degree of distortion. The image captured by the camera module 40a having a variable aperture stop with a relatively small f-number can refer to FIG. 38, and the image captured by the camera module 40a having a variable aperture stop with a relatively large f-number can refer to FIG. 39. FIG. 38 shows an image captured by the electronic device 4 with a camera module 40a having a variable aperture stop with an f-number of 1.4, FIG. 39 shows an image captured by the electronic device 4 with a camera module 40a having a variable aperture stop with an f-number of 5.6, and the captured images as shown in FIG. 38 and FIG. 39 include birds flying in front of the cathedral. As shown in FIG. 38, when the variable aperture stop of the camera module 40a provides a relatively large light pass aperture, the image sensor receives more light, but the background in the image is relatively blurry. As shown in FIG. 39, when the variable aperture stop of the camera module 40a provides a relatively small light pass aperture, the image sensor receives less light, but the background in the image is relatively clear. The captured images as shown in FIG. 38 and FIG. 39 have a relatively small field of view, and the camera module 40a having a variable aperture stop can be used for shooting moving targets. For example, the lens driving unit can drive the lens assembly to quickly and continuously autofocus on the target, such that the captured image of the target would not be blurred due to deviation from the focusing position. When imaging, the camera module 40a having a variable aperture stop can further perform optical zoom for imaged objects so as to obtain clearer images. In addition, the camera module 40e can determine depth information of the imaged object. In this embodiment, the electronic device 4 includes multiple camera modules 40*a*, 40*b*, 40*c*, 40*d*, and 40*e*, but the present disclosure is not limited to the number and arrangement of camera modules.

When a user captures images of an object OBJ, light rays converge in the camera module 40*a*, the camera module 40*b* or the camera module 40*c* to generate images, and the flash module 42 is activated for light supplement. The focus assist module 43 detects the object distance of the imaged object OBJ to achieve fast auto focusing. The image signal processor is configured to optimize the captured image to improve image quality. The light beam emitted from the focus assist module 43 can be either conventional infrared or laser.

In addition, the light rays may converge in the camera module 40*d* or the camera module 40*e* to generate images. The electronic device 4 can include a reminder light 4*a* that can be illuminated to remind the user that the camera module 40*d* or the camera module 40*e* is working. The display module 45 can be a touch screen or physical buttons such as a zoom button 451 and a shutter release button 452. The user is able to interact with the display module 45 and the image software processor having multiple functions to capture images and complete image processing. The image processed by the image software processor can be displayed on the display module 45. The user can replay the previously captured image through an image playback button 453 of the display module 45, can choose a suitable camera module for shooting through a camera module switching button 454 of the display module 45, and can properly adjust shooting parameters according to current shooting situations through an integrated menu button 455 of the display module 45.

Further, the electronic device 4 further includes a circuit board 48 and a plurality of electronic components 49 disposed on the circuit board 48. The camera modules 40*a*, 40*b*, 40*c*, 40*d*, and 40*e* are electrically connected to the electronic component 49 via connectors 481 on the circuit board 48. The electronic components 49 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 49 can also include a storage unit, a random access memory for storing image information, a gyroscope, and a position locator for facilitating the navigation or positioning of the electronic device 4. In this embodiment, the image signal processor, the image software processor and the random access memory are integrated into a single chip system 44, but the present disclosure is not limited thereto. In some other embodiments, the electronic components can also be integrated in the camera module or can also be disposed on one of the circuit boards. In addition, the user can use the biometric identification device 47 to turn on and unlock the electronic device 4.

The smartphone in this embodiment is only exemplary for showing the camera modules 1-3 of the present disclosure installed in the electronic device 4, and the present disclosure is not limited thereto. The camera modules 1-3 can be optionally applied to optical systems with a movable focus. Furthermore, the camera modules 1-3 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens, having an optical axis, and the imaging lens comprising:
    a lens carrier, configured for at least one lens element to be disposed therein, wherein the lens carrier comprises a mount structure; and
    a variable through hole assembly, comprising:
        a plurality of movable blades, movably and together surrounding the optical axis to form a through hole, wherein a size of the through hole is variable by movement of the plurality of movable blades; and
        a rotatable element, connected to the plurality of movable blades, wherein the rotatable element moves the plurality of movable blades to vary the size of the through hole;
        wherein the rotatable element is sleeved on at least part of the lens carrier so as to be disposed on the mount structure.

2. The imaging lens according to claim 1, wherein the plurality of movable blades are disposed on the mount structure, the mount structure comprises a plurality of post structures that are disposed respectively corresponding to the plurality of movable blades, and a relative displacement between the plurality of post structures and the rotatable element drives the plurality of movable blades to rotate.

3. The imaging lens according to claim 1, wherein the plurality of movable blades are disposed on the mount structure, the mount structure has a gap surface, the gap surface and the rotatable element form a gap therebetween, and the plurality of movable blades are disposed in the gap;
    wherein a thickness of the gap is TG, a thickness of each of the plurality of movable blades is TB, and the following condition is satisfied:

$$0.002\ [\text{um}] \leq TG - TB \leq 0.3\ [\text{um}].$$

4. The imaging lens according to claim 1, further comprising a fixed element, wherein the plurality of movable blades are disposed on the mount structure, the fixed element and the lens carrier are relatively fixed, the fixed element has a gap surface, the gap surface and one of the mount structure and the rotatable element form a gap therebetween, and the plurality of movable blades are disposed in the gap;
    wherein a thickness of the gap is TG', a thickness of each of the plurality of movable blades is TB, and the following condition is satisfied:

$$0.002\ [\text{um}] \leq TG' - TB \leq 0.3\ [\text{um}].$$

5. The imaging lens according to claim 1, wherein the plurality of movable blades are disposed on the mount structure, the mount structure has an abut surface, and the plurality of movable blades are disposed on the abut surface;
wherein a value of arithmetical mean roughness of the abut surface is smaller than 0.25 micrometers.

6. The imaging lens according to claim 1, wherein the rotatable element is disposed on the mount structure, the variable through hole assembly further comprises a plurality of rollable elements, and the plurality of rollable elements are disposed between the mount structure and the rotatable element and are arranged surrounding the through hole to provide freedom of movement of the rotatable element in a rotation direction.

7. The imaging lens according to claim 1, wherein the rotatable element is disposed on the mount structure, the mount structure has a slide surface, and the rotatable element is slidably located on the slide surface;
wherein a coefficient of kinetic friction of the rotatable element on the slide surface is smaller than 0.52.

8. The imaging lens according to claim 1, wherein the through hole is disposed at a position where an aperture of the imaging lens is located.

9. The imaging lens according to claim 8, wherein an f-number of the imaging lens is FNO, and the following condition is satisfied:

$FNO \geq 1.1$.

10. The imaging lens according to claim 1, wherein the at least one lens element comprises a positive lens element disposed adjacent to the through hole.

11. The imaging lens according to claim 1, wherein the variable through hole assembly further comprises an electromagnetic pair and a through hole circuit, the electromagnetic pair comprises a through hole magnet and a through hole coil, the through hole magnet is disposed on the rotatable element, the through hole coil is disposed opposite to the through hole magnet, and the through hole coil is electrically connected to the through hole circuit to drive the rotatable element to rotate.

12. The imaging lens according to claim 11, wherein the through hole circuit comprises a control circuit, and the control circuit control the through hole coil to generate a magnetic field.

13. The imaging lens according to claim 11, wherein the through hole circuit comprises a position sensing circuit, and the position sensing circuit detects a position of the rotatable element.

14. The imaging lens according to claim 11, wherein a quantity of the electromagnetic pair is two, and the two electromagnetic pairs are symmetrically disposed.

15. The imaging lens according to claim 11, wherein the lens carrier further comprises a ferromagnetic element disposed corresponding to the through hole magnet.

16. A camera module, comprising:
the imaging lens of claim 11.

17. The camera module according to claim 16, further comprising:
a fixed part;
a movable part, movable with respect to the fixed part, wherein the movable part comprises the imaging lens; and
an elastic element, connected to the fixed part and the movable part to provide freedom of movement of the movable part in at least one direction;
wherein the elastic element has electrical conductivity, and the elastic element is electrically connected to the through hole circuit.

18. The camera module according to claim 16, further comprising:
a fixed part;
a movable part, movable with respect to the fixed part, wherein the movable part comprises the imaging lens;
an elastic element, connected to the fixed part and the movable part to provide freedom of movement of the movable part in at least one direction; and
an electrical connection element, comprises a plurality of conductive routes electrically connected to the through hole circuit and the fixed part;
wherein an elastic modulus of the electrical connection element is smaller than an elastic modulus of the elastic element in a direction in parallel with the optical axis.

19. The camera module according to claim 16, further comprising:
a fixed part, comprising a conductive terminal; and
a movable part, movable with respect to the fixed part, wherein the movable part comprises the imaging lens, a groove structure and a conductive colloid, and the conductive colloid is disposed in the groove structure;
wherein the conductive terminal extends to the conductive colloid, and the conductive terminal is electrically connected to the through hole circuit via the conductive colloid.

20. The camera module according to claim 19, wherein the conductive colloid is made of a damping material.

21. The camera module according to claim 16, further comprising:
a fixed part;
a movable part, movable with respect to the fixed part, wherein the movable part comprises the imaging lens; and
a driving part, comprising a driving magnet and a driving coil, wherein the driving magnet and the driving coil are disposed opposite to each other;
wherein the lens carrier further comprises a driving mount structure, and one of the driving magnet and the driving coil is disposed on the driving mount structure.

22. The camera module according to claim 21, wherein the driving coil is mounted on the driving mount structure, and the driving coil is electrically connected to the through hole circuit.

23. The camera module according to claim 16, further comprising an image sensor disposed on an image surface of the imaging lens, wherein a distance between the optical axis of the imaging lens and a position of the image sensor located furthest away from the optical axis of the imaging lens is defined as a maximum image height, the maximum image height is ImgH, and the following condition is satisfied:

$ImgH \geq 2$ [mm].

24. The camera module according to claim 23, wherein the imaging lens has a maximum field of view corresponding to the maximum image height, the maximum field of view is FOV, and the following condition is satisfied:

$FOV \leq 100$ [deg.].

25. An electronic device, comprising:
the camera module of claim 16.

* * * * *